US012809416B2

(12) United States Patent
Turner et al.

(10) Patent No.: US 12,809,416 B2
(45) Date of Patent: Nov. 24, 2026

(54) OPTICAL COMPUTING SYSTEM WITH DISAGGREGATED MEMORY

(71) Applicant: Lightmatter, Inc., Boston, MA (US)

(72) Inventors: Robert Turner, Georgetown, TX (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 565 days.

(21) Appl. No.: 18/364,983

(22) Filed: Aug. 3, 2023

(65) Prior Publication Data

US 2024/0045464 A1 Feb. 8, 2024

Related U.S. Application Data

(60) Provisional application No. 63/395,311, filed on Aug. 4, 2022.

(51) Int. Cl.
*G06E 1/00* (2006.01)

(52) U.S. Cl.
CPC .................................... *G06E 1/00* (2013.01)

(58) Field of Classification Search
None
See application file for complete search history.

(56) References Cited

U.S. PATENT DOCUMENTS

| | | | | |
|---|---|---|---|---|
| 6,198,558 B1 * | 3/2001 | Graves | H04Q 11/0062 370/395.51 |
| 9,893,804 B1 * | 2/2018 | Koopferstock | H04J 14/0271 |
| 11,860,413 B2 | 1/2024 | Harris et al. | |
| 2012/0033978 A1 | 2/2012 | Morris et al. | |
| 2021/0203740 A1 * | 7/2021 | Xie | G06F 12/0897 |
| 2021/0258078 A1 | 8/2021 | Meade et al. | |
| 2023/0297237 A1 * | 9/2023 | Lazovsky | G02B 6/12019 |

OTHER PUBLICATIONS

International Search Report and Written Opinion dated Nov. 23, 2023, in connection with International Application No. PCT/US2023/029412.

Vaibhawa et al., MONet: heterogeneous Memory over Optical Network for large-scale data center resource disaggregation. Journal of Optical Communications and Networking. IEEE. May 1, 2021;13(5):126-39. DOI: 10.1364/JOCN.419145.

* cited by examiner

*Primary Examiner* — Baboucarr Faal
(74) *Attorney, Agent, or Firm* — Wolf, Greenfield & Sacks, P.C.

(57) ABSTRACT

Described herein are embodiments of a photonic computing system comprising one or more processors in communication with disaggregated memory through one or more optical channels. The disaggregated memory comprises multiple memory units placed on a photonic substrate that includes a photonic network that can be programmed to configure which of the memory units can be accessed by each of the processor(s).

20 Claims, 21 Drawing Sheets

OPTICAL COMPUTING SYSTEM WITH DISAGGREGATED MEMORY

RELATED APPLICATIONS

This application claims the benefit under 35 U.S.C. § 119(e) of U.S. Provisional Patent Application No. 63/395,311 filed on Aug. 4, 2022, entitled "COMPUTE AND MEMORY DISAGGREGATION USING RECONFIGURABLE OPTICAL COMMUNICATION SUBSTRATE", which is incorporated by reference herein in its entirety.

FIELD

Aspects of the present disclosure relate to an optical computing system comprising one or more processors in communication with one or more disaggregated memory blocks. Each of the disaggregated memory block(s) may comprise multiple memory units interconnected through a photonic network.

BACKGROUND

A memory unit may be a chip comprising of an integrated circuit that can store data. A memory unit may include random access memory (RAM) or read only memory (ROM). For example, a memory unit may be a dynamic RAM (DRAM) chip, a static RAM (SRAM) chip, a programmable ROM (PROM) chip, or erasable PROM (EPROM). A processor may use memory units to store information. For example, a processor may use a RAM chip to temporarily store information (e.g., software application program instructions and/or data). As another example, a ROM chip may store firmware for operating a device.

SUMMARY

Described herein are embodiments of a photonic computing system comprising one or more processors in communication with disaggregated memory through one or more optical channels. The disaggregated memory comprises multiple memory units placed on a photonic substrate that includes a photonic network that can be programmed to configure which of the memory units can be accessed by each of the processor(s).

Some embodiments provide a photonic computing system. The photonic computing system comprises: at least one processor; at least one optical channel; and at least one photonic substrate separate from the at least one processor, the at least one photonic substrate comprising a plurality of memory units and at least one photonic network for providing the at least one processor access to the plurality of memory units, wherein: the at least one photonic network is in communication with the at least one processor through the at least one optical channel; and the at least one photonic network is programmable to configure which of the plurality of memory units in the at least one photonic substrate the at least one processor can access through the at least one optical channel.

Some embodiments provide a method of using a photonic network to perform parallelized data processing using a plurality of memory units. The photonic network is programmable to configure which of the plurality of memory units can be accessed by a first processor and a second processor. The photonic network is programmed to enable access to a first memory unit of the plurality of memory units by the first processor and to enable access to a second memory unit of the plurality of memory units by the second processor. The method comprises: programming the photonic network to enable access to the second memory unit by the first processor and to enable access to the first memory unit by the second processor; executing, by the first processor, an operation using data stored in the second memory unit to obtain an output; and executing, by the second processor in parallel with execution of the first processor, an operation using data stored in the first memory unit.

Some embodiments provide a photonic network placed on a photonic substrate. The photonic network is accessible through at least one optical channel. The photonic network comprises: a plurality of memory units; at least one configurable optical switch that controls which of the plurality of memory units are accessible through the at least one optical channel; and at least one electrical/optical (E/O) transceiver for transmitting data to and from the plurality of memory units through the at least one optical channel.

Some embodiments provide a method of manufacturing a photonic computing system. The method comprises manufacturing the photonic computing system to include: at least one processor; at least one optical channel; and at least one photonic substrate separate from the at least one processor, the at least one photonic substrate comprising a plurality of memory units and at least one photonic network for connecting the at least one processor to the plurality of memory units, wherein: the at least one photonic network is in communication with the at least one processor through the at least one optical channel; and the at least one photonic network is programmable to configure which of the plurality of memory units in the at least one photonic substrate the at least one processor can access through the at least one optical channel.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
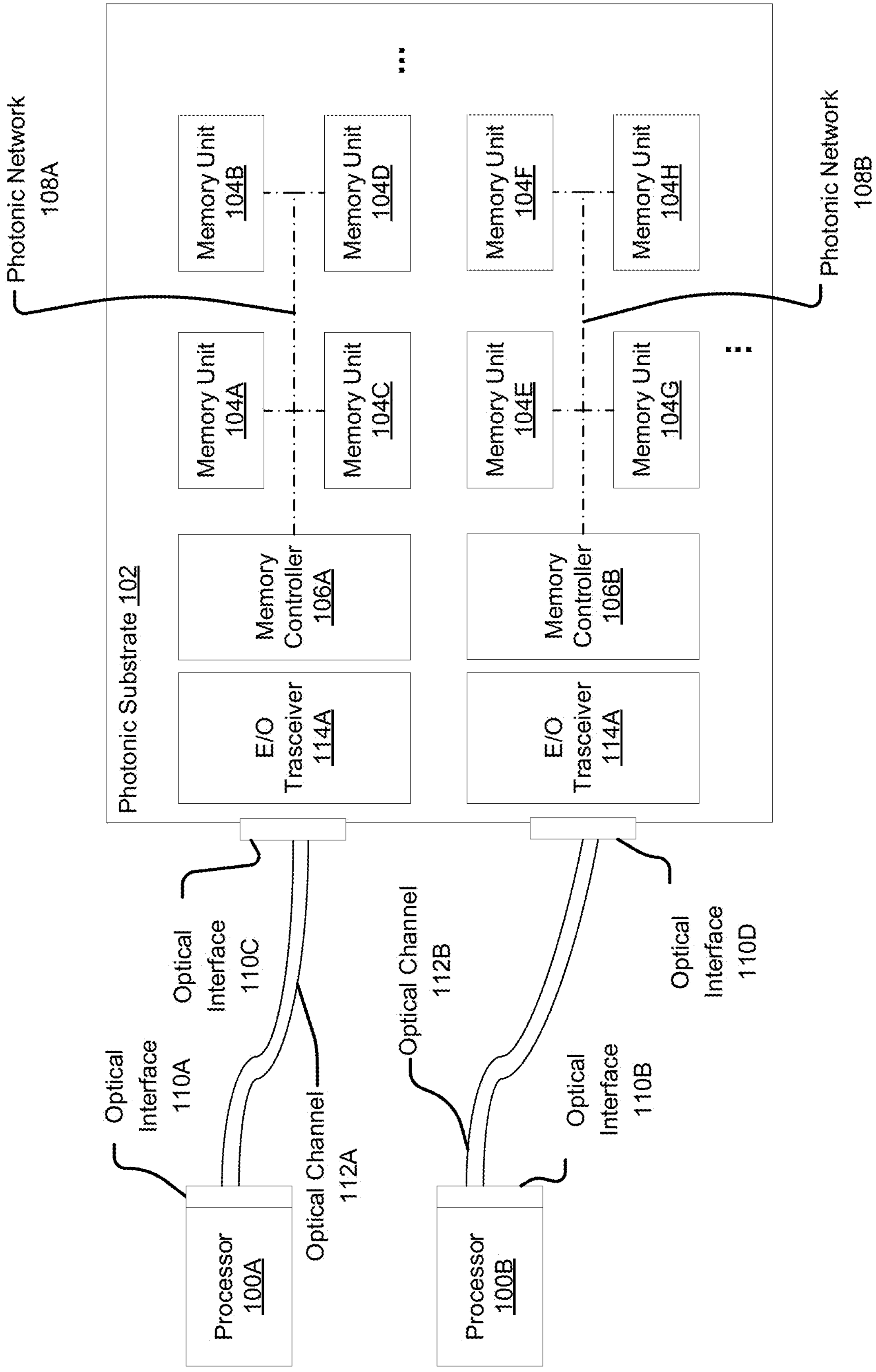
FIG. 1A is an example photonic computing system, according to some embodiments of the technology described herein.

Described herein are embodiments of a photonic computing system comprising one or more processors in communication with disaggregated memory through one or more optical channels. The disaggregated memory comprises multiple memory units placed on a photonic substrate that includes a photonic network that can be programmed to configure which of the memory units can be accessed by each of the processor(s).

Typically, processors need to make a tradeoff between (1) memory capacity, and (2) memory bandwidth/latency and resources (e.g., power and space on a chip). This tradeoff often results in limiting memory capacity to maintain target bandwidth/latency, reduce chip size, and reduce power consumption. Conventional high bandwidth memory (HBM) can provide memory bandwidths as high as 800 gigabytes/second (GB/s) but consume a significant amount of power (e.g., approximately 6 pJ/bit), and require a large amount of space on a chip. An HBM memory unit needs to be millimeters away from a processor (e.g., a compute die) accessing the HBM memory unit. A conventional HBM only offers up to 48 GB densities in a memory unit (e.g., a stack of one or more memory dies). The size and spacing constraints limit the number of stacks in a chip to only two stacks, which is a total of 96 GB of HBM. High-speed double data rate (DDR) memory does not require as much space on a chip as HBM and uses less power than HBM. However, DDR provides a lower bandwidth of up to 32 GB/s and worse latency than HBM.

Limiting processors to a specific attached set of high-density memory (e.g., HBM and/or DDR) requires communication between the processors when executing parallelizable applications. Parallelization often requires multiple processors to access a shared set of data. This data thus needs to be transferred between memories of the multiple processors. This reduces the efficiency of parallel execution and creates data redundancies. It may be more efficient for the processors to access data when memory storing data can be accessed by all the processors as this eliminates the need to transfer data between different memories. Conventional techniques to allow this capability involve building a multichip package that requires several tape-outs, which introduces complexity in managing multiple different products. Moreover, power and area resource constraints restrict performance for certain applications. This requires increasingly application-specific chip designs.

Disaggregating memory from the processors such that memory units can be reconfigured to connect to different processors would allow more efficient parallelization. However, conventional techniques of disaggregating memory from processors are power intensive, have low bandwidth, and high latency. As a result, conventional disaggregated memory systems are limited to disaggregating disk drives and/or solid state drives because this storage hardware already has large power costs of greater than 10 pJ/bit. Moreover, conventional disaggregated memory systems provide low bandwidth with high latency making them unsuitable for execution of applications requiring high bandwidth and low latency.

To address the above-described shortcomings in memory design for processors, the inventors have developed techniques that utilize photonics to disaggregate memory from processors in a computing system. The techniques allow increasing memory density accessible to a processor without sacrificing memory bandwidth. The techniques place a disaggregated pool of memory units on a photonic substrate with a photonic network that can be programmed to configure which memory units can be accessed by each of the processors. The processors communicate with the pool of memory units through one or more optical channels. The techniques can support memory bandwidth greater than 15 terabytes/second (TB/s).

Some embodiments comprise a photonic substrate, separate from processors, that includes multiple memory units (e.g., memory stacks) and a programmable photonic network. The photonic network can be programmed into different configurations to change which processors are connected to respective ones of the memory units. This allows a computing system to use a paradigm for parallelizing the execution of operations that does not rely on transferring data between different memory. The photonic network can be programmed to reconfigure connections between memory units and processors thereby reducing or even eliminating the need to transfer data between memory units to parallelize operations. This allows more efficient parallelization of operations.

In some embodiments, the programmable photonic network can dynamically reconfigure the amount of memory allocated to a processor. As such, the photonic network can be programmed according to application execution requirements. For example, an application requiring more memory for execution may be allocated more memory from the memory pool, while an application requiring less memory for execution may be allocated less memory from the memory tool. Further, the photonic network increases the amount of memory (e.g., high-density memory) that can be attached to a processor with high bandwidth without being constrained by the size and space limitations of conventional HBM. For example, the techniques no longer require an HBM memory unit to be within millimeters of a processor (e.g., a compute die) that accesses the HBM memory unit.

Some embodiments allow a processor to communicate with one or more sets of memory units through one or more optical channels (e.g., a fiber-optic cable). The optical channel allows the processor to be separated from the set(s) of memory units. Whereas conventional techniques typically require a processor to be placed on a chip (e.g., a silicon interposer) with high-density memory units (e.g., HBM units), some embodiments herein allow the processor to be separate from chip(s) that include the set(s) of memory units. For example, the techniques allow a processor to connect to memory units housed in a package or a chassis separate from the processor.

Some embodiments provide a photonic computing system. The photonic computing system comprises one or more processors, one or more optical channels, and a photonic substrate separate from the processor(s). The photonic substrate comprises multiple memory units and a photonic network for connecting the processor(s) to the memory units. The photonic network is in communication with the processor(s) through the optical channel. The photonic network is programmable to configure which of the memory units in the photonic substrate can be accessed by the processor(s) through the optical channel.

Some embodiments provide a photonic computing system. The photonic computing system comprises: at least one processor; at least one optical channel (e.g., one or more optical fibers); and at least one photonic substrate (e.g., a photonic interposer) separate from the at least one processor, the at least one photonic substrate comprising a plurality of memory units (e.g., HBM units, SRAM units, DDR SDRAM units) and at least one photonic network for providing the at least one processor access to the plurality of memory units. The at least one photonic network is in communication with the at least one processor through the at least one optical channel. The at least one photonic network is programmable to configure which of the plurality of memory units in the at least one photonic substrate the at least one processor can access through the at least one optical channel.

In some embodiments, the at least one processor comprises a first processor and a second processor; and the first processor and the second processor are configured to process a dataset using the plurality of memory units. In some embodiments, the at least one photonic network is programmed to enable access to a first memory unit of the plurality of memory units by the first processor and to enable access to a second memory unit of the plurality of memory units by the second processor; and processing the dataset comprises: executing, by the first processor, an operation using data stored in the first memory unit to obtain a first output; and storing the first output in the first memory unit. In some embodiments, after storing the first output in the first memory unit, the at least one photonic network is programmed to enable access to the first memory unit by the second processor and to enable access to the second memory unit by the first processor; and processing the dataset further comprises: executing, by the first processor, an operation using data stored in the second memory unit to obtain a second output; executing, by the second processor in parallel with execution by the first processor, an operation using the first output stored in the first memory unit to obtain a first result; storing the second output in the second memory unit; and outputting the first result from the first memory unit. In some embodiments, the at least one photonic network is programmed to enable access to the first memory unit by the first processor and to enable access to the second memory unit by the second processor; and processing the dataset stored in the plurality of memory units of the at least one photonic network further comprises: executing, by the first processor, an operation using data stored in the first memory unit to obtain a third output; executing, by the second processor in parallel with the execution of the first processor, an operation using the second output stored in the second memory unit to obtain a second result; storing the third output in the first memory unit; and outputting the second result from the second memory unit.

In some embodiments, the at least one photonic network comprises at least one optical switch configurable to connect/disconnect the at least one processor to/from each of the plurality of memory units; the at least one photonic network is programmable by configuring the at least one optical switch.

In some embodiments, at a first time, the at least one photonic network is programmed to enable access to a first one of the plurality of memory units by the at least one processor through the at least one optical channel; and at a second time subsequent to the first time, the at least one photonic network is programmed to: disable access to the first memory unit by the at least one processor through the at least one optical channel; and enable access to a second one of the plurality of memory units by the at least one processor through the at least one optical channel.

In some embodiments, the at least one processor comprises a first processor and a second processor; the plurality of memory units comprises a first memory unit and a second memory unit; and the at least one photonic network is programmed to enable access to the first memory unit by the first processor and access to the second memory unit by the second processor.

In some embodiments, the at least one photonic substrate further comprises at least one memory controller configured to program the at least one photonic network. In some embodiments, the at least one processor is configured to program the at least one photonic network.

In some embodiments, the at least one processor comprises a plurality of processors, the plurality of processors organized into multiple sets of processors; and the at least one photonic network is programmed to enable each of the sets of processors to access a different subset of the plurality of memory units through the at least one optical channel. In some embodiments, each of the sets of processors and respective subset of the plurality of memory units accessible by the set of processors forms a respective virtual processor assigned to a respective virtual machine. In some embodiments, the at least one processor comprises a plurality of processors; the at least one optical channel comprises a plurality of optical channels; and each of the plurality of processors is in communication with the at least one photonic network through a respective one of the plurality of optical channels. In some embodiments, the at least one photonic network comprises a plurality of photonic networks; the at least one photonic substrate comprises a plurality of photonic modules each including: a respective one of the plurality of photonic networks; a subset of the plurality of memory units; and a memory controller. In some embodiments, each of the plurality of processors is connected to memory controllers of the plurality of photonic modules through a respective one of the plurality of optical channels.

In some embodiments, the at least one photonic network is programmed into a configuration to allocate memory units among the plurality of processors based on memory requirements for execution of a plurality of software applications, wherein the configuration: enables access to a first set of the plurality of memory units by a first one of the plurality of processors configured to execute a first software application (e.g., a software application that uses a machine learning model such as a large language model (LLM), a computer vision model, a software development and testing application, and/or other type of software application); and enable access to a second set of the plurality of memory units by a second one of the plurality of processors configured to execute a second software application (e.g., a software application that uses a machine learning model such as a large language model (LLM), a computer vision model, a software development and testing application, and/or other type of software application).

In some embodiments, the at least one photonic substrate comprises a plurality of photonic substrates, the plurality of photonic substrates each comprising a set of memory units and a respective photonic network, wherein: photonic networks of the plurality of substrates are each programmable to configure which of a respective set of memory units can be accessed by the at least one processor. In some embodiments, the photonic computing system comprises an optical switch, wherein the optical switch is configurable to provide the at least one processor with access to multiple memory units distributed across multiple ones of the plurality of photonic substrate.

In some embodiments, the at least one photonic substrate comprises at least one memory controller; and the at least one photonic network comprises an optical circuit interconnecting the at east one memory controller with the plurality of memory units. In some embodiments, the at least one photonic network comprises a plurality of electrical/optical (E/O) transceivers each connecting a respective one of the plurality of memory units to the optical circuit.

In some embodiments: the at least one photonic substrate comprises: at least one memory controller; at least one fiber attach, the at least one fiber attach connected to the at least one optical channel; and at least one E/O transceiver; and the at least one photonic network comprises an optical circuit connecting the at least one memory controller to the at least one fiber attach, wherein the E/O transceiver is configured to convert signals transmitted between the at least one memory controller and the at least one fiber attach. In some embodiments, the at least one photonic network comprises a plurality of electrical connections between the at least one memory controller and the plurality of memory units, wherein data signals are transmitted between the at least one memory controller and the plurality of memory units through the plurality of electrical connections.

Some embodiments provide photonic network placed on a photonic substrate. The photonic network is accessible through at least one optical channel. The photonic network comprises: a plurality of memory units; at least one configurable optical switch that controls which of the plurality of memory units are accessible through the at least one optical channel; and at least one electrical/optical (E/O) transceiver for transmitting data to and from the plurality of memory units through the at least one optical channel.

In some embodiments, at a first time, the at least one optical switch is configured to enable access to a first one of the plurality of memory units through the at least one optical channel; and at a second time subsequent to the first time, the at least one optical switch is configured to enable access to a second one of the plurality of memory units through the at least one optical channel. In some embodiments, at the second time, the at least one optical switch is programmed to disable access to the second memory unit through the at least one optical channel.

In some embodiments, the photonic network further comprises a memory controller, wherein the at least one optical switch is configurable by the memory controller. In some embodiments, the photonic network comprises an optical circuit, the optical circuit comprising the at least one configurable optical switch. In some embodiments: the at least one E/O transceiver comprises a plurality of E/O transceivers connected to respective ones of the plurality of memory units; and the optical circuit connects the memory controller to the plurality of memory units through the plurality of E/O transceivers. In some embodiments, the photonic network further comprises a fiber attach, wherein: the optical circuit connects the memory controller to the fiber attach through the at least one E/O transceiver.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A is an example photonic computing system, according to some embodiments of the technology described herein. The photonic computing system includes processors 100A, 100B, a photonic substrate 102, and sets of one or more optical channels 112A, 112B through which respective processors 100A, 100B are connected to the photonic substrate 102. The processors 100A, 100B may be configured to access memory units 104 placed on the photonic substrate 102 through respective sets of optical channels 112A, 112B.

Each of the processors 100A, 100B may be any suitable processor. In some embodiments, a processor may comprise a central processing unit (CPU) comprising logic circuitry to execute instructions. The CPU may be configured to perform arithmetic, logical, and input/output (I/O) operations. In some embodiments, a processor may comprise a graphics processing unit (GPU). The GPU may be configured to perform graphics processing. For example, the GPU may perform image processing operations. In some embodiments, a processor may comprise a neural processing unit (NPU) configured to perform neural network processing. For example, the NPU may process inputs to a neural network model using weights of the neural network model to determine an output of the neural network model for the inputs. In some embodiments, a processor may comprise an analog processor. For example, an analog processor may be a photonic processor. Example photonic processors that may be used in some embodiments are described in U.S. Pat. No. 11,218,227, which is incorporated herein by reference.

In some embodiments, one or more of the processors 100A, 100B may be a multi-core processor. For example, a processor may have 2, 4, 6, 8, 10, or 12 cores. The multi-core processor may be configured to simultaneously process multiple sets of instructions. In some embodiments, each of the processors 100A, 100B may be virtualized processor cores (e.g., vCPUs).

As shown in FIG. 1A, the processors 100A, 100B include respective optical interfaces 110A, 110B through which the processors 100A, 100B may transmit and/or receive data as light transmissions. In some embodiments, each of the optical interfaces 110A, 110B may comprise a fiber attach for connecting to a set of one or more optical fibers. In some embodiments, the optical fiber(s) can be attached vertically through the use of vertical grating couplers and lenses. In some embodiments, the optical fiber(s) can be attached through edge attach using edge couplers, v-grooves, or evanescent couplers. In some embodiments, the optical fiber(s) may be pluggable through the use of a pluggable glass module. The processors 100A, 100B may each transmit and receive light transmissions through a set of optical fiber(s).

The photonic computing system of FIG. 1A includes a photonic substrate 102. The photonic substrate includes memory units 104A, 104B, 104C, 104D, 104E, 104F, 104G, 104H and two photonic networks 108A, 108B. A first set of memory units 104A, 104B, 104C, 104D may be accessed through photonic network 108A. A second set of memory units 104E, 104F, 104G, 104H may be accessed through photonic network 108B. Examples of memory units include HBM, DRAM, non-volatile random access memory (NVRAM), and/or NAND flash. The photonic substrate 102 also includes electrical/optical (E/O) transceivers 114A, 114B, and optical interfaces 110C, 110D. In some embodiments, the photonic substrate 102 includes memory controllers 106A, 106B connected to respective photonic networks 108A, 108B. The memory controllers 106A, 106B may be configured to program the respective photonic networks to select one or more memory units for connection to each processor, thereby enabling write and read operations.

It should be noted that instead of having separate photonic networks as shown in FIG. 1A, a common photonic network may be used across all the memory units in some embodiments. A common memory controller may program the common photonic network. Further, in some embodiments, the photonic substrate 102 may not include the memory controllers 106A, 106B. In such embodiments, a memory controller external to photonic substate 102 may program the photonic networks (s). One or more of the processors 100A and 100B may serve as the external memory controller.

In some embodiments, the photonic networks may include multiple photonic modules. Each photonic module may be uniquely associated with a particular memory unit (or a particular subset of the memory units), and may be programmed to enable or disable access to that memory unit or subset. For example, each photonic module may include one more programmable photonic switches configured to connect to, or disconnect from, the corresponding memory unit or subset of memory units. In some embodiments, photonic modules forming the photonic substrate 102 may be manufactured using microfabrication techniques (e.g., complementary metal-oxide-semiconductor (CMOS) microfabrication techniques). For example, the photonic modules may be patterned as multiple copies of a template photonic module using step and repeat lithography-based fabrication techniques. A detailed description of the photonic modules is provided in U.S. Pat. No. 11,036,002, which is incorporated herein by reference in its entirety.

In some embodiments, each of the photonic networks 108A, 108B may be a programmable photonic network. Each of the photonic networks 108A, 108B may be programmable to configure which of the memory units 104A-104H is accessible by each of the processors 100A, 100B. For example, the photonic network 108A, when programmed into a particular configuration, may provide access to one or more of memory units 104A, 104B, 104C, 104D to the processor 100A and/or access to one or more of memory units 104A, 104B, 104C, 104D to the processor 100B. As another example, the photonic network 108B, when programmed into a particular configuration, may provide access to one or more of memory units 104E, 104F, 104G, 104H to the processor 100A and/or access to one or more of memory units 104E, 104F, 104G, 104H to the processor 100B. Thus, each of the photonic networks 108A, 108B may be programmed to selectively place the processors 100A, 100B in communication with respective subsets of the memory units 104A-104H.

In some embodiments, a configuration of each of the photonic networks 108A, 108B may be dynamic. As such, the photonic networks 108A, 108B may be programmed multiple times. For example, the photonic networks 108A, 108B may be programmed during execution of instructions to provide the processors 100A, 100B to different ones of the memory units 104A-104H. In some embodiments, the photonic networks 108A, 108B may be programmed as part of executing parallelized operations. Example techniques of executing parallelized execution of operations are described herein. In some embodiments, the photonic networks 108A, 108B may be programmed to allocate memory to a virtual machine (e.g., a virtual CPU). For example, memory may be allocated to a virtual machine based on the requirements of an application to be executed by the virtual machine.

As illustrated in the example of FIG. 1A, in some embodiments, a photonic network may interconnect memory units and a memory controller in an optical circuit. For example, photonic network 108A may include an optical circuit interconnecting memory units 104A, 104B, 104C, 104D and memory controller 106A. As another example, photonic network 108B may include an optical circuit interconnecting memory units 104E, 104F, 104G, 104H and memory controller 106B. In such embodiments, each memory unit may be connected to the photonic network through a respective E/O transceiver for converting data read and write signals between electrical and optical signals. For example, E/O transceivers may be connected to an optical circuit of a photonic network through which the E/O transceivers may transmit and receive optical signals. Although the example embodiment of FIG. 1A shows a single E/O transceiver associated with a photonic network, in some embodiments, the photonic substrate 102 may include multiple E/O transceivers each associated with a memory unit.

In some embodiments, a photonic network may comprise of an optical circuit that connects a memory controller to an optical interface (e.g., a fiber attach), and electrical connections between the memory controller and memory units. For example, memory controller 106A may be connected to a fiber attach through an optical circuit and may be connected to memory units 104A, 104B, 104C, 104D through electrical connections. The memory controller 106A may transmit and receive data signals (e.g., read and write signals) to/from the memory units 104A, 104B, 104C, 104D through the electrical connections. In such embodiments, an E/O transceiver may convert data signals to/from the memory controller between electrical and optical signals. For example, E/O transceiver 114A may convert data signals to/from memory controller 106A between electrical and optical signals.

Figure 1B:
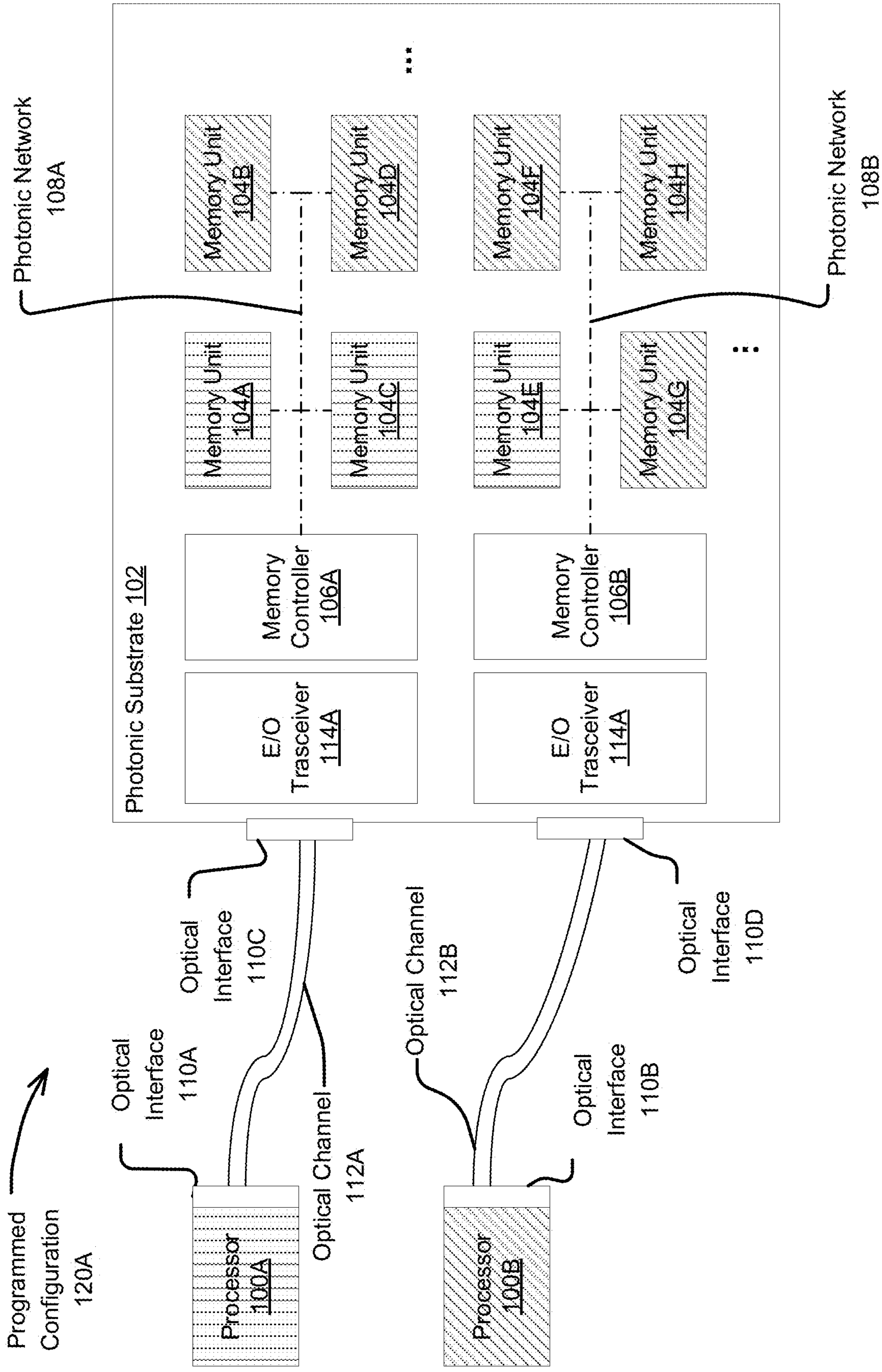
FIG. 1B is a first programmed configuration of photonic networks in the photonic computing system of FIG. 1A, according to some embodiments of the technology described herein.

FIG. 1B is a first programmed configuration 120A of the photonic networks 108A, 108B, according to some embodiments of the technology described herein. For example, the configuration 120A of FIG. 1B may be for executing one or more instructions by each of the processors 100A, 100B. In the first programmed configuration 120A, photonic network 108A is programmed to provide the processor 100A access to memory units 140A, 140C and to provide the processor 100B access to memory units 104B, 104D. Photonic network 108B is programmed to provide the processor 100A access to memory unit 104E and to provide the processor 100B access to memory units 104F, 104G, 104H. As illustrated in FIG. 1B, the processor 104A and all the memory units that is has access to in the configuration 120A are shaded with horizontal lines. The processor 100B and all the memory units that it has access to in the configuration 120A are shaded with diagonal lines.

Figure 1C:
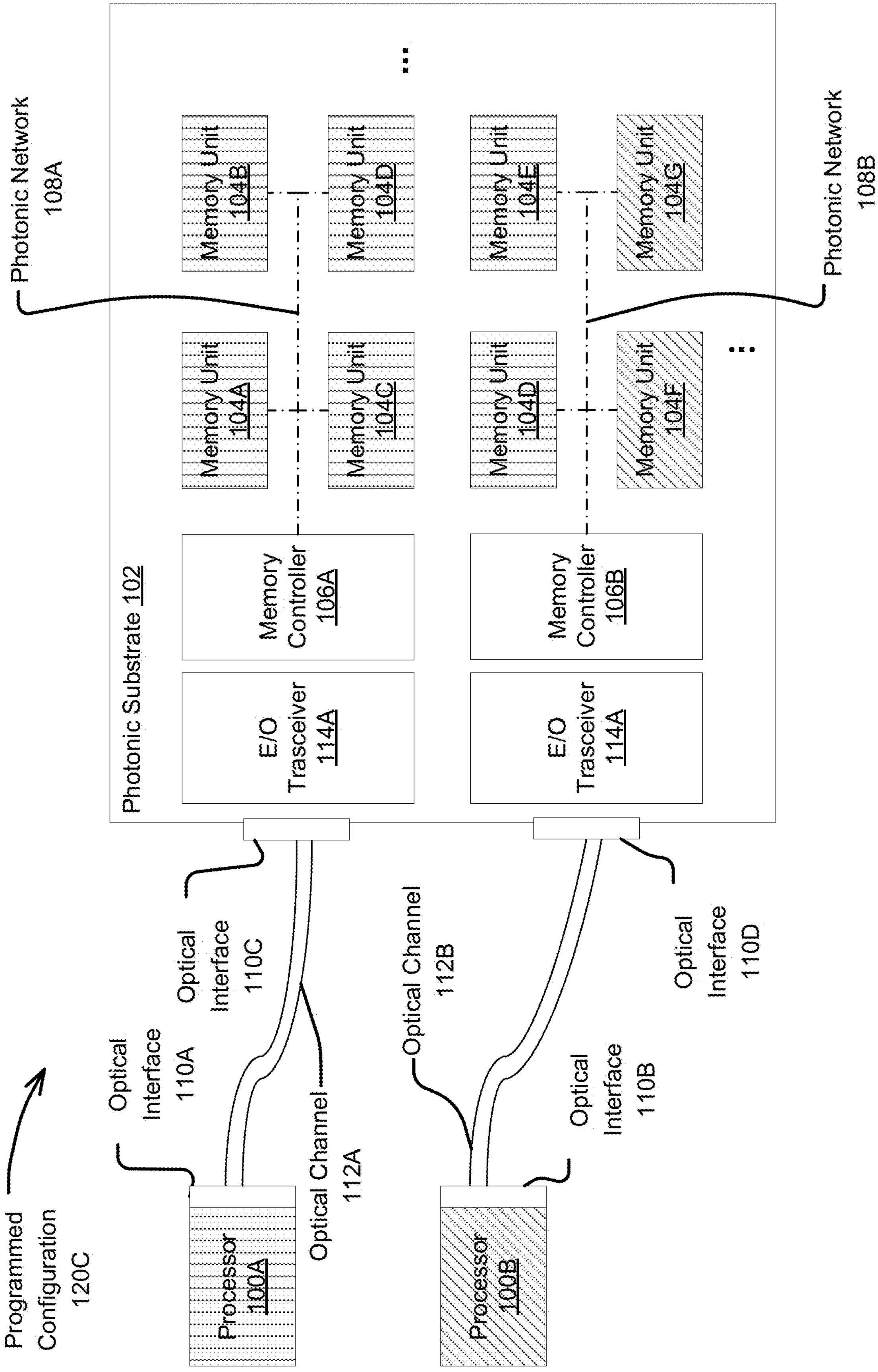
FIG. 1C is a second programmed configuration of photonic networks in the photonic computing system of FIG. 1A, according to some embodiments of the technology described herein.

FIG. 1C is a second programmed configuration 120B of the photonic networks 108A, 108B, according to some embodiments of the technology described herein. For example, the configuration 120B of FIG. 1C may be for executing one or more instructions by each of the processors 100A, 100B subsequent to the configuration 120A of FIG. 1B. In the second programmed configuration 120B, the photonic network 108A is programmed to provide the processor 100A access to 104A, 104B, 104C, 104D. Photonic network 108B is programmed to provide the processor 100A access to memory units 104D, 104E and provide the processor 100B access to memory units 104F, 104G. As illustrated in FIG. 1B, the processor 104A and all the memory units that is has access to in the configuration 120A are shaded with horizontal lines. The processor 100B and all the memory units that it has access to in the configuration 120A are shaded with diagonal lines.

In some embodiments, each of the photonic networks 108A, 108B comprises one or more photonic switches. Each of the photonic networks 108A, 108B may be programmed by configuring the one or more photonic switches of the photonic network. Examples of optical switches that may be included in each of the photonic networks 108A, 108B include Mach-Zehnder interferometers, optical resonators, multi-mode interference (MMI) waveguides, arrayed waveguide gratings (AWG), thermos-optic switches, acousto-optic switches, magneto-optic switches, micro-electromechanical switches (MEMS) optical switches, non-linear optical switches, liquid crystal switches, piezoelectric beam steering switches, grating switches, dispersive switches, and/or other suitable optical switches. In some embodiments, the one or more optical switches of a photonic network may be implemented in an optical circuit. The one or more optical switches may be configured to control the routes in the optical circuit. In some embodiments, the one or more optical switches may be integrated into the photonic substrate 102.

In embodiments in which the photonic substrate 102 includes memory controllers 106A, 106B, the photonic networks 108A, 108B may be programmed by respective memory controllers 106A, 106B. The memory controller 106A may be configured to program photonic network 108A and the memory controller 106B may be configured to program photonic network 108B. In some embodiments, each of the memory controllers 106A, 106B may be configured to program a respective one of the photonic networks 108A, 108B by configuring one or more switches of the photonic network. The memory controller 106A may be connected to an optical circuit including optical switches that can be controlled by the memory controller 106A. The memory controller 106A may configure the optical switches in the optical circuit to control which of the memory units 104A, 104B, 104C, 104D can be accessed through the optical circuit by the processor 100A. The memory controller 106B may be connected to an optical circuit including optical switches that can be controlled by the memory controller 106B. The memory controller 106A may configure the optical switches in the optical circuit to control which of the memory units 104E, 104F, 104G, 104H can be accessed through the optical circuit by the processor 100B.

In some embodiments, the photonic networks 108A, 108B may be programmed by the processors 100A, 100B. In some embodiments, the photonic networks 108A, 108B may be programmed by the processors 100A, 100B simultaneously. Optical switches of the photonic networks 108A, 108B may be configured by the processors 100A, 100B to program the photonic networks 108A, 108B. For example, the photonic networks 108A, 108B may be programmed by the processors 100A, 100B in embodiments in which the photonic substrate 102 does not include memory controllers 106A, 106B. Although not illustrated in the example of FIG. 1A, in some embodiments, the photonic networks 108A, 108B may be programmed by a separate host. For example, the host may be a CPU. For example, the CPU may access to a configuration of a portion or of all the photonic networks in the photonic substrate 102.

In some embodiments, each of the E/O transceivers 114A, 114B may include an electrical-to-optical converter such as an optical modulator, and an optical-to-electrical converter such as an optical receiver. The electrical-to-optical converter may be configured to convert electrical data signals generated from reading memory units (e.g., by a memory controller) into optical signals that can be transmitted through an optical channel to a processor. The optical-to-electrical converter may be configured to convert optical signals received through an optical channel from a processor to electrical data signals for storing data in memory units (e.g., by a memory controller). In some embodiments, an E/O transceiver may contain a shim that converts one electronic protocol to another electronic protocol. For example, the shim may convert the signals/protocols used between a memory controller and a processor to one or more SerDes signals. These SerDes signals may then drive photonic transmission (TX) components within a large photonic interposer. The conversion may simply be a direct analog signal conversion or a more sophisticated data conversion in the digital domain. For example, HBM3 has a bandwidth of 9.2 Gb/s per pin, but optical links may operate at higher speeds (50-100 Gb/s per signal). Therefore, multiple HBM3 pin signals may be serialized into a single optical signal which can then be deserialized at the receiver side.

In some embodiments, each of the optical interfaces 110A, 110B may provide an interface for respective optical channels 112A, 112B. In some embodiments, the optical channels 112A, 112B each comprise a set of one or more optical fibers. The optical interfaces 110A, 110B may each comprise a fiber attach may include one or more ports through which a set of optical fiber(s) can connect to an E/O transceiver. A fiber attach may include a fiber coupler (e.g., an out-of-plane coupler or an edge coupler) that can be coupled to the optical channel. The fiber coupler may allow a memory controller to communicate with a processor through the optical channel.

In some embodiments, each of the memory controllers 106A, 106B may each comprise a digital circuit for controlling input and output of data from memory units. In some embodiments, each of the memory controllers 106A, 106B may be configured to control access to respective sets of memory units (e.g., for on-chip SRAM memory units). For example, memory controller 106A may read data from memory units 104A, 104B, 104C, 104D requested by processors 100A, 100B, and write data transmitted from the processors 100A, 100B into memory units 104A, 104B, 104C, 104D. In some embodiments, the memory controllers 106A, 106B may be integrated memory controllers that are integrated with respective sets of memory units on a chip. In some embodiments, the memory controllers 106A, 106B may be separate from the memory units 104A-104H (e.g., for DRAM, NVRAM, and flash memory units). Further, in some embodiments, the memory controller 106A, 106B may be manufactured monolithically with the photonic substrate 102, the E/O transceivers 114A, 114B, the photonic networks 108A, 108B, and the memory units 104A-H.

In some embodiments, each of the memory controllers 106A, 106B may be configured to manage allocation of memory units to the processors 100A, 100B. For example, the memory controller may be configured to allocate memory to a processor 100A based on a process (e.g., a software application) being executed by the processor. The memory controller may be configured to determine the memory resources required for the process and allocate memory units to the processor 100A accordingly. In some embodiments, the memory controllers 106A, 106B may be configured to determine an allocation of memory units to the processors 100A, 100B based on a parallel programming model being used by a process. The memory controllers 106A, 106B may allocate memory units to the processors 100A, 100B according to the parallel programming model to enable parallelized execution of a process. The memory controllers 106A, 106B may be configured to program respective photonic networks 108A, 108B based on determined memory allocations.

As shown in the example of FIG. 1A, in some embodiments, the processors 100A, 100B access the memory units 104A-104H through respective optical channels 112A, 112B. In some embodiments, an optical channel may provide a path for transmission of light. In some embodiments, an optical channel may comprise one or more optical fibers. For example, each of the optical fiber(s) may be a strand of glass, plastic, or other suitable material that transmits light. Multiple such strands may be bundled into a set of optical fibers (e.g., into an optical fiber cable). In some embodiments, an optical channel may transmit data at a rate of at least 1-5, 5-10, 15-20, 20-25, or 25-30 terabytes per second (TB/s). For example, an optical channel may transmit data between a processor and a photonic network at a rate of at least 15 TB/s. In some embodiments, each optical channel can carry one or more optical signals, for example through the use of wavelength division multiplexing or polarization multiplexing schemes.

In some embodiments, error correction may be used to allow for higher bandwidth photonic communication. Error correction may be performed on data transmissions to and/or from the memory units through photonic networks. For example, error correction code (ECC) may be used to perform error correction. In some embodiments, a memory controller may be configured to perform error correction on data transmissions to and/or from memory units. In some embodiments, processors 100A, 100B may be configured to perform error correction on data received from memory units. The use of error correction may allow for higher bandwidth photonic communication at the expense of increased latency for performance of the error correction.

Figure 2A:
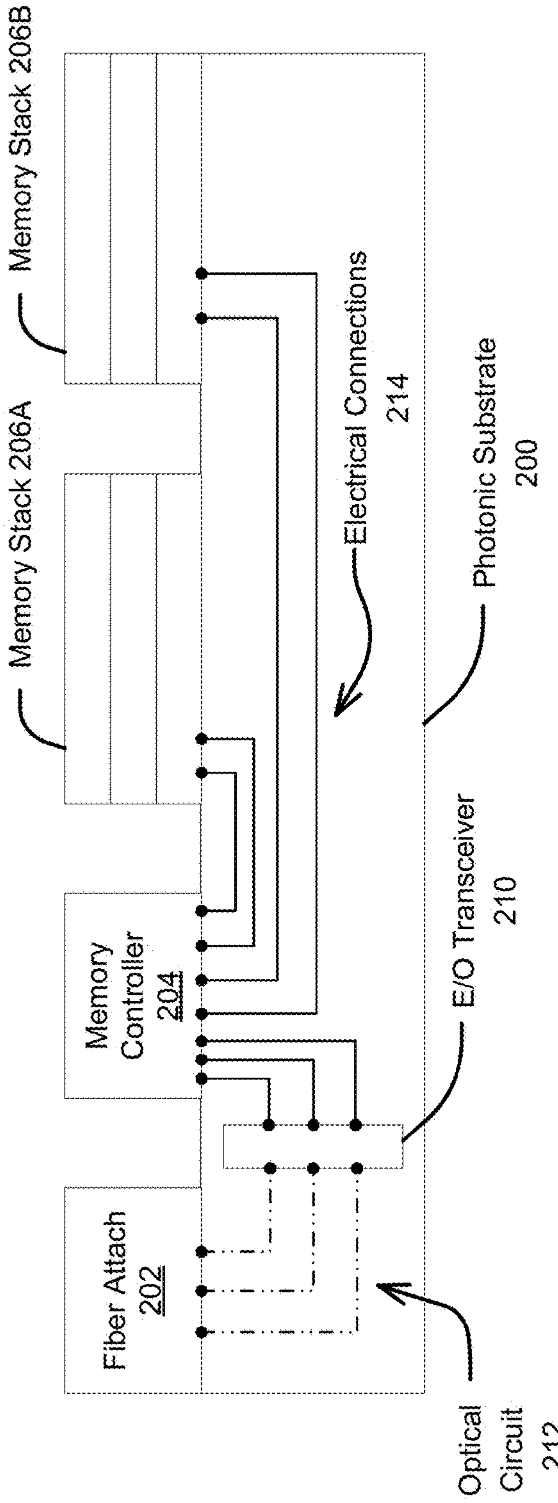
FIG. 2A is a side view of a photonic substrate, according to some embodiments of the technology described herein.
Figure 2B:
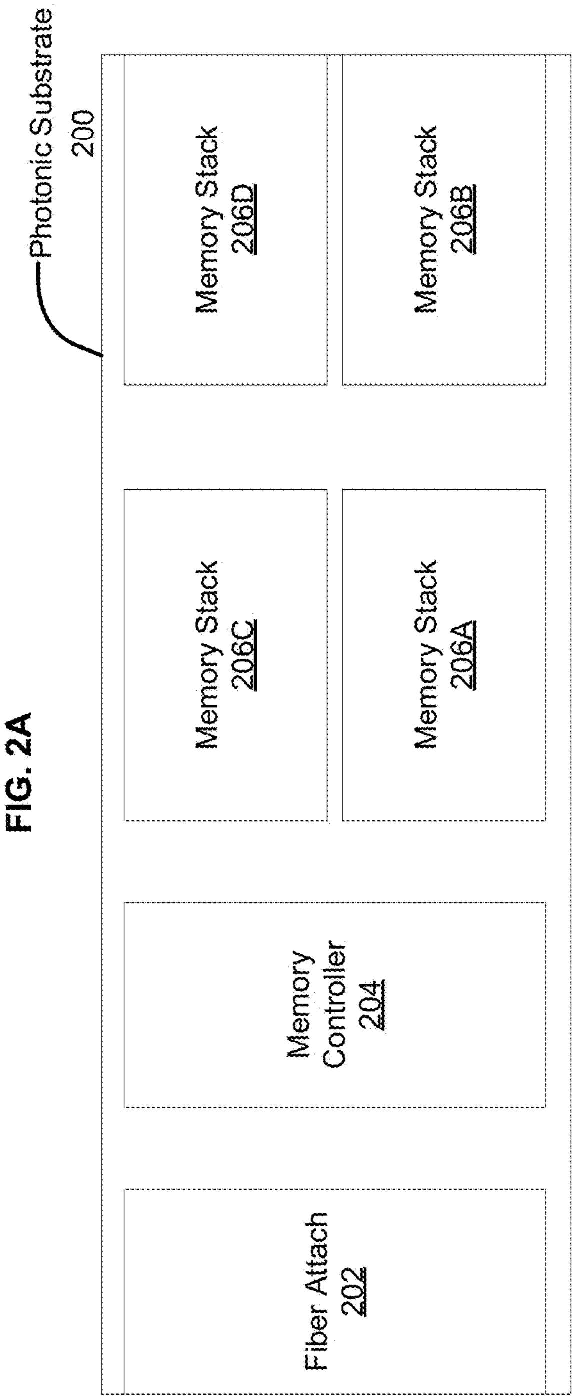
FIG. 2B is an aerial view of the photonic substrate of FIG. 2A, according to some embodiments of the technology described herein.

FIG. 2A is a side view of a photonic substrate 200, according to some embodiments of the technology described herein. FIG. 2B is an aerial view of the photonic substrate 200. As shown in FIG. 2B, the photonic substrate 200 includes a memory controller 204, memory stack 206A, memory stack 206B, memory stack 206C, and memory stack 206D. For example, the photonic substrate 200 shown in FIG. 2A may be a portion of the photonic substrate 102 described herein with reference to FIGS. 1A-1C. The memory stack 206A, 206B, 206C, 206D may be memory units 104A, 104B, 104C, 104D of FIGS. 1A-1C.

As shown in FIG. 2A, a fiber attach 202, E/O transceiver 210, memory controller 204, memory stack 206A, and memory stack are placed on the photonic substrate 200. The photonic substrate 200 further includes an integrated optical circuit 212 which may form a photonic network (e.g., photonic network 108A). The optical circuit 212 may include integrated optical switches that can be configured to program the photonic network. As shown in FIG. 2A, the optical circuit 212 connects the fiber attach 202 to the E/O transceiver 210. Accordingly, optical signals may be transmitted to and from the E/O transceiver 210 through the optical circuit 212.

In some embodiments, the E/O transceiver 210 may include the use of wavelength division multiplexing (WDM) where multiple signals, each at a different wavelength of light, are used to increase the transmission bandwidth in a single optical waveguide or optical fiber. Some embodiments may use dense WDM. In dense WDM, the wavelengths may be spaced apart by 100-200 GHz spacing. Some embodiments may use coarse WDM. In coarse WDM, the wavelengths may be spaced apart by >10 nm. Overall, WDM reduces the number of fibers that need to be attached to the photonic substrate 200.

As shown in FIG. 2A, the photonic substrate includes electrical connections 214 through which electrical signals can be transmitted between the E/O transceiver 210 and the memory controller 204, and between the memory controller 204 and the memory stacks 206A, 206B, 206C, 206D. The electrical connections 214 may be configured to transmit electrical data signals generated from reading and writing to the memory stacks 206A, 206B, 206C, 206D. For example, the electrical connections 214 may be used by the memory controller 204 to obtain electrical data signals from reading data from the memory stacks 206A, 206B, 206C, 206D and to transmit the electrical data signals to the E/O transceiver 210 (e.g., for transmission of corresponding optical signals to a processor separate from the photonic substrate 200). As another example, the electrical connections 214 may be used by the memory controller 204 to obtain electrical data signals from the E/O transceiver 210 corresponding to optical signals transmitted from an external processor, and to transmit the electrical data signals to the memory stacks 206A, 206B, 206C, 206D to write data into memory.

In some embodiments, each of the memory stacks 206A, 206B, 206C, 206D may comprise a stack of dies. For example, each of the memory stacks 206A, 206B, 206C, 206D may be a stack of 3 dies, though other numbers of stacked dies are possible. The stack of dies may be mounted to the photonic substrate 200. In some embodiments, a stack of dies may form a memory unit. In some embodiments, each of the memory stacks 206A, 206B, 206C, 206D may be any suitable type of memory. For example, each memory stack may be HBM, DDR, DDRAM, SRAM, DDR SDRAM, or other suitable type of memory.

In some embodiments, the memory controller 204 may be another die mounted to the photonic substrate 200. As described herein with reference to FIGS. 1A-1C, the memory controller 204 may be configured to configure optical switches of the optical circuit 212 to configure which of the memory stacks 206A, 206B, 206C, 206D are accessible by external processors. In some embodiments, the optical circuit 212 may be configurable to allow one or more external processors to access a particular memory stack. In some embodiments, the optical circuit 212 may be configurable to allow only one external processor to access a particular memory stack at a time.

In the example shown in FIG. 2A, communication between fiber attach 202 and E/O transceiver 210 is performed photonically, while communication between E/O transceiver 210 and memory stacks 206 is performed electrically. In other examples, as discussed below in connection with FIGS. 2C-2D, the fiber attach may be coupled to the memory stacks photonically, and optical switch modules may be used to route optical signals.

Figure 2C:
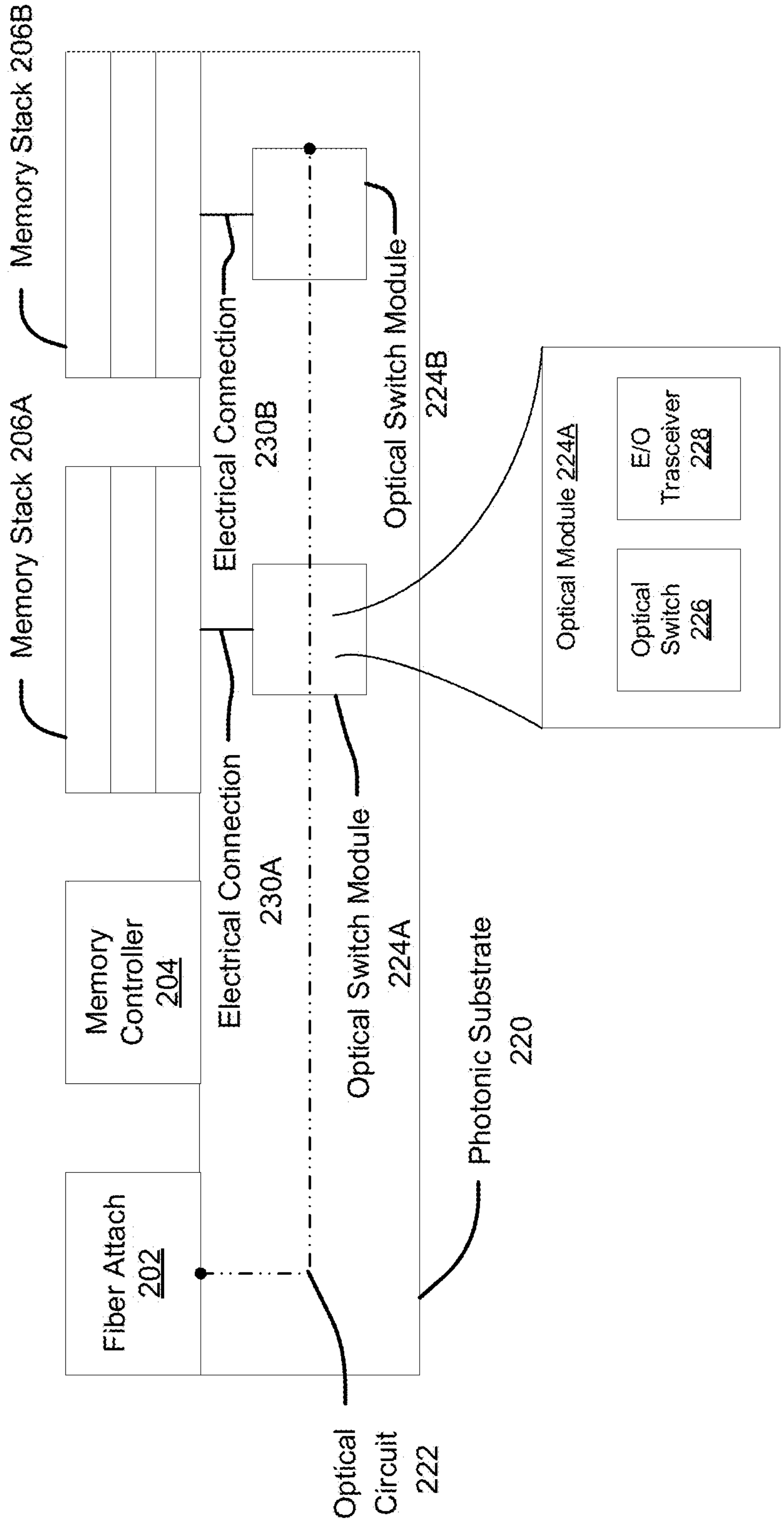
FIG. 2C is a side view of another photonic substrate, according to some embodiments of the technology described herein.

FIG. 2C is a side view of another photonic substrate 220, according to some embodiments of the technology described herein. As shown in FIG. 2C, the photonic substrate 220 includes the memory controller 204, memory stacks 206A, 206B. For example, the photonic substrate 220 shown in FIG. 2C may be a portion of the photonic substrate 102 described herein with reference to FIGS. 1A-1C. The memory stacks 206A, 206B may be memory units 104A, 104B. The photonic substrate 220 may include other memory stacks (e.g., memory stacks 206C, 206D) not shown in FIG. 2C.

In the example embodiment of FIG. 2C, the photonic substrate 220 includes a photonic network comprising optical circuit 222 providing an optical channel for light transmissions to and/or from the memory stacks 206A, 206B. The optical circuit 222 may connect to memory stacks of the photonic substrate 220. The optical circuit 222 includes optical switch modules 224A, 224B that can be configured to control which of the memory stacks 206A, 206B is accessible (e.g., by a processor). The memory controller 204 may be configured to configure program the photonic network by configuring the optical switch modules 224A, 224B. The optical switch modules 224A, 224B are connected to respective memory stacks 206A, 206B through respective electrical connections 230A, 230B. The electrical connections 230A, 230B may, for example, comprise electrically conductive material (e.g., metallic wiring).

FIG. 2C shows example components of an optical module. As shown in the box expanded from optical module 224A, the optical module 224A includes an optical switch 226. Example optical switches are described herein. The optical module 224A further includes an E/O transceiver 228 for conversion between optical and electrical signals. When the optical switch 226 is configured to enable access to the memory stack 206A, the E/O transceiver 228 may be configured to convert optical signals received through the optical circuit 222 (e.g., through the fiber attach) into electrical signals that can be transmitted through the electrical connection 230A. For example, the E/O transceiver 228 may transmit optical data signals in to electrical data signals (e.g., for writing data to the memory stack 206A). The E/O transceiver 228 may further be configured to convert electrical signals received through the electrical connection 230A into optical signals that can be transmitted through the optical circuit 222. For example, the E/O transceiver 228 may convert electrical data signals obtained from reading data from the memory stack 206A into optical data signals that are transmitted through the optical circuit 222.

Figure 2D:
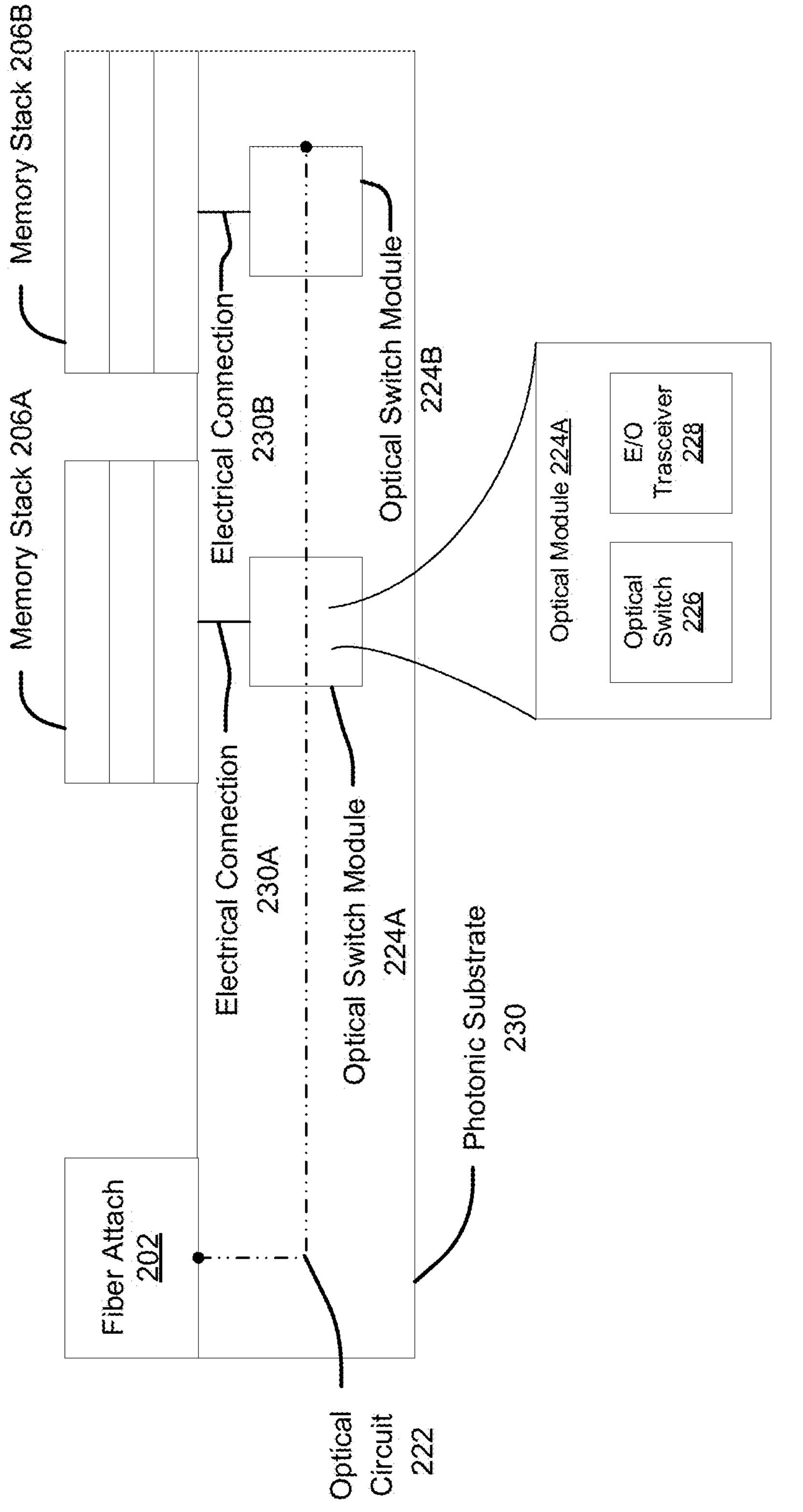
FIG. 2D is a side view of another photonic substrate, according to some embodiments of the technology described herein.

FIG. 2D is a side view of another photonic substrate 230, according to some embodiments of the technology described herein. As shown in FIG. 2D, the photonic substrate 230 includes memory stacks 206A, 206B. For example, the photonic substrate 230 shown in FIG. 2D may be a portion of the photonic substrate 102 described herein with reference to FIGS. 1A-1C. The memory stacks 206A, 206B may be memory units 104A, 104B. The photonic substrate 230 may include other memory stacks (e.g., memory stacks 206C, 206D) not shown in FIG. 2D.

In the example embodiment of FIG. 2D, the photonic substrate 230 includes a photonic network comprising optical circuit 222 providing an optical channel for light transmissions to and/or from the memory stacks 206A, 206B. The optical circuit 222 may connect to memory stacks of the photonic substrate 220. The optical circuit 222 includes optical switch modules 224A, 224B that can be configured to control which of the memory stacks 206A, 206B is accessible (e.g., by a processor). The memory controller 204 may be configured to configure program the photonic network by configuring the optical switch modules 224A, 224B. The optical switch modules 224A, 224B are connected to respective memory stacks 206A, 206B through respective electrical connections 230A, 230B. The electrical connections 230A, 230B may, for example, comprise electrically conductive material (e.g., metallic wiring).

As illustrated in the example embodiment of FIG. 2D, the photonic substrate 230 does not include a memory controller. In such embodiments, the photonic network comprising the optical circuit 222 may be programmed by an external processor (e.g., an external memory controller or other processor connected to the photonic substrate 230). The external processor may program the photonic network by configuring optical switches of the optical switch modules 224A, 224B. The external processor may transmit configuration instructions (e.g., through an optical channel) that are transmitted to the optical switch modules 224A, 224B through the optical circuit 222. For example, the configuration instructions may be included as a prefix and/or suffix of data read and/or write signals.

Figure 3:
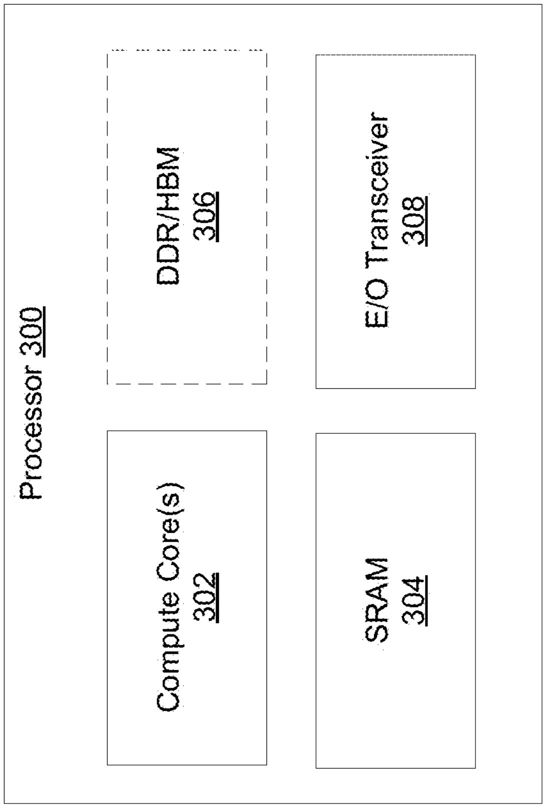
FIG. 3 is an example processor of a photonic computing system, according to some embodiments of the technology described herein.

FIG. 3 is an example processor 300 of a photonic computing system, according to some embodiments of the technology described herein. For example, the processor 300 may be one of the processors 100A, 100B described herein with reference to FIGS. 1A-1C. As shown in FIG. 3, the processor 300 includes one or more compute cores 302, static RAM (SRAM) 304, an E/O transceiver 308, and optional DDR or HBM 306.

In some embodiments, the compute core(s) 302 may include one or more CPUs, GPUs, NPUs, photonic processors, and/or other compute cores. The SRAM 304 may be used by the compute core(s) 302 to execute instructions (e.g., as part of executing a software application program). For example, the SRAM 304 may store instructions and/or data for execution by the compute core(s) 302.

In some embodiments, the processor 300 may include DDR and/or HBM 306. For example, the processor 300 may execute data-intensive applications and thus use DDR and/or HBM 306. For example, the processor 300 may be used to execute an application to train a deep learning model and/or perform inference using the same. Deep learning models often use a large number of parameters (e.g., millions of weights and/or activations) and thus require additional storage capacity for the processor 300. As another example, the processor 300 may be used for graphics processing. Graphics processing may involve processing continuous frames of thousands of pixels and thus require additional storage capacity.

Figure 4:
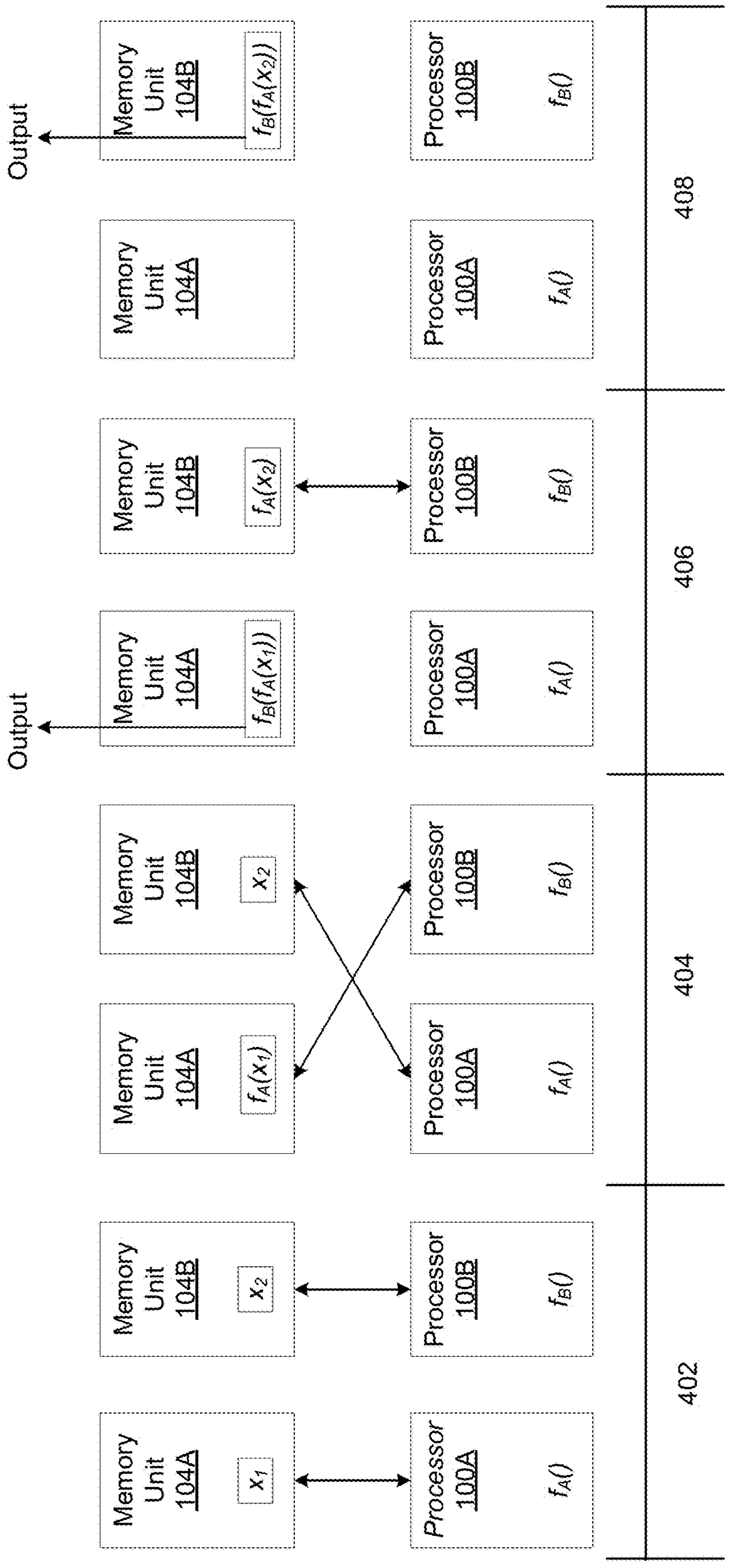
FIG. 4 illustrates an example parallelization paradigm that may be used by some embodiments of the technology described herein.

FIG. 4 illustrates an example parallelization paradigm that may be used by some embodiments of the technology described herein. For example, the parallelization paradigm of FIG. 4 may be used by the photonic computing system described herein with reference to FIGS. 1A-1C. In the example of FIG. 4, the photonic computing system executes the process $f_B(f_A(x_i))$, where $f_A$ is an application to be executed by a first processor (e.g., processor 100A) and $f_B$ is an application to be executed by a second processor (e.g., processor 100B). $x_i$ denotes the i-th data point to be provided as input. Each of the applications $f_A$ and $f_B$ may comprise of one or more operations.

Execution of the process begins at stage 402 by storing input $x_1$ in memory unit 102A and input $x_2$ in memory unit 102B. In some embodiments, the inputs $x_1$ and $x_2$ may be loaded into respective memory units 104A, 104B in parallel. The processor 100A then executes $f_A(x_1)$ and stores the result in memory unit 104A.

Next, at stage 404, the photonic network 108A is programmed to provide the first processor 100A access to the memory unit 104B and to provide the second processor 100B access to the memory unit 104A. The first processor 100A executes $f_A(x_2)$ using the input $x_2$ stored in the memory unit 104B and stores the result in the memory unit 104B. In parallel with execution of the first processor 100A, the second processor 100B executes $f_B(f_A(x_1))$ using the value of $f_A(x_1)$ stored in the memory unit 104A and stores the result in the memory unit 104A.

Next, at stage 406, the result of executing $f_B(f_A(x_1))$ is output from memory unit 104A. The photonic network 108A is programmed to provide the processor 104B access to the memory unit 104B, which currently stores a result of process $f_A(x_2)$ executed in stage 404. The processor 104B executes the process $f_B(f_A(x_2))$ and stores the result in memory unit 104B.

Next, at stage 408, the result of executing the process $f_B(f_A(x_2))$ stored in the memory unit 104B is output from the memory unit 104B. In some embodiments, a subsequent pair of inputs (e.g., $x_3$ and $x_4$) may be loaded into the memory units 104A, 104B and the execution process of stages 402-408 may be performed again.

In the parallelization paradigm illustrated by the example of FIG. 4, execution of two applications is parallelized by programming of a photonic network to dynamically configure which processors can access memory units through the photonic network. As a result, input and output data for each application being executed by a respective processor resides within a single memory location (e.g., one or more memory units). Unlike in conventional parallelization paradigms, the act of copying and transferring of data between memory locations may be omitted. Thus, there is no communication needed between memory units. Further, no memory needs to be allocated for data copying. Rather, both of the memory units are used for the execution of the applications. Moreover, coherency is automatically maintained in the parallelization paradigm because there is only a single copy of each input and result of application(s) executed using the input.

Figure 5A:
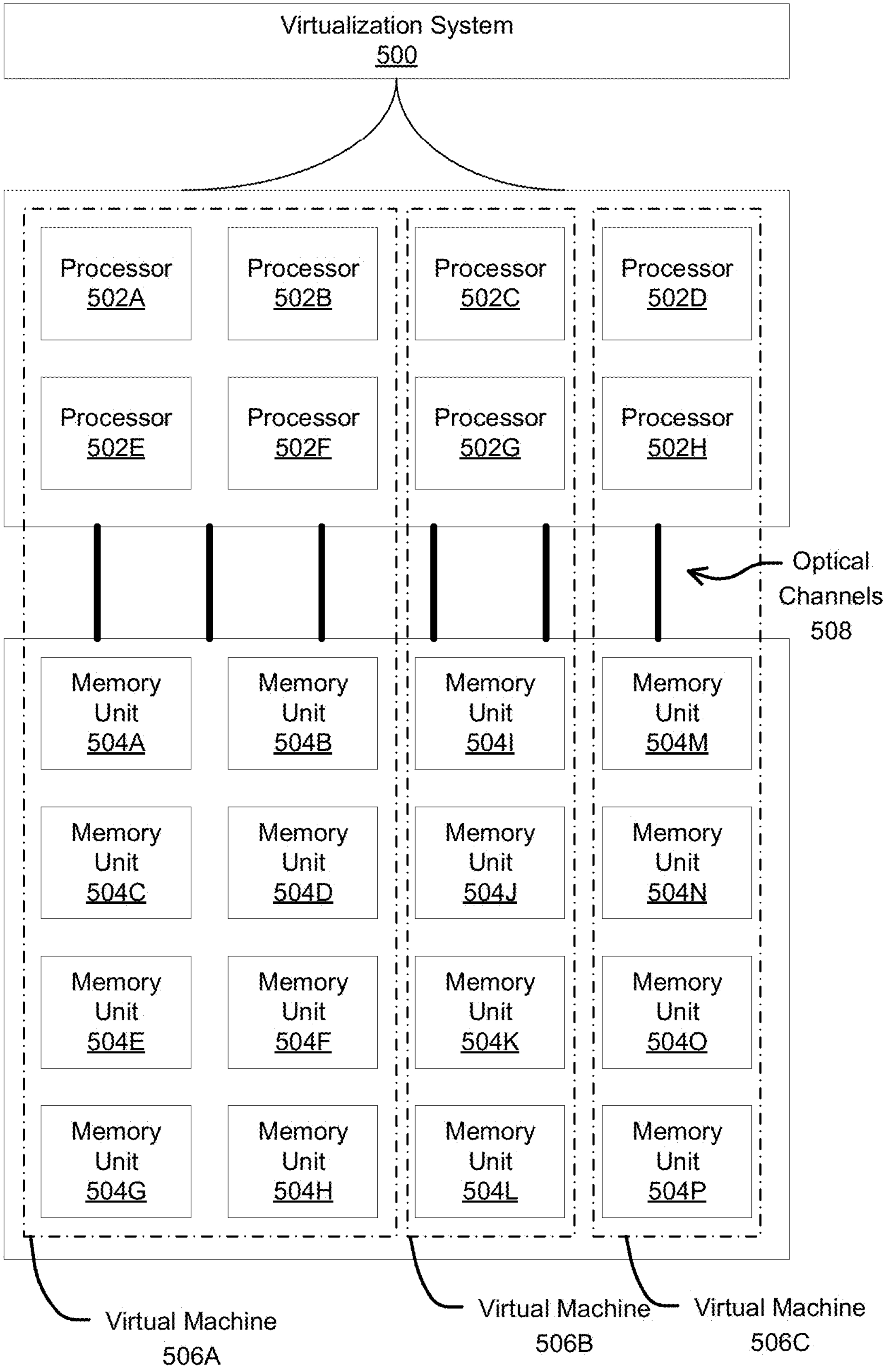
FIG. 5A illustrates virtualization that can be performed using a computing system of some embodiments of the technology described herein.

FIG. 5A illustrates virtualization that can be performed using a computing system of some embodiments of the technology described herein. As shown in FIG. 5A, a virtualization system 500 determines an allocation of processors and respective sets of memory units for virtual machines 506A, 506B, 506C. In some embodiments, the virtualization system 500 may be configured to allocate processing capacity and memory to the virtual machines 506A, 506B, 506C using a virtual machine management software application. For example, the virtualization system 500 may use VMWare, Citrix Virtual Apps & Desktops, or another suitable virtual machine management software application.

The allocation of FIG. 5A may be performed by programming one or more photonic networks to allocate a set of memory units to a set of processors. Example techniques of programming a photonic network to allocate memory unit(s) to processor(s) are described herein. In the example of FIG. 5A, the photonic network(s) are programmed to: (1) allocate virtual machine 506A processors 502A, 502B, 502E, 502F with access to memory units 504A, 504B, 504C, 504D, 504E, 504F, 504G, 504H; (2) allocate virtual machine 506B processors 502C, 502G with access to memory units 504I, 504J, 504K, 504L; and (3) allocate virtual machine 506C processors 502D, 502H with access to memory units 504M, 504N, 504O, 504P.

In some embodiments, the virtualization system 500 may be configured to allocate the virtual machines 506A, 506B, 506C to different users. The allocation may allow multiple different users to use virtual machines executed by a shared set of processing and memory resources. Each of the virtual machines 506A, 506B, 506C may be configured for a respective user by programming a photonic network to grant the virtual machine access to a set of memory units. In some embodiments, the photonic network may be dynamically reprogrammed during execution of the virtual machines 506A, 506B, 506C to re-allocate memory resources (e.g., based on changes in memory demands of the virtual machines 506A, 506B, 506C).

Figure 5B:
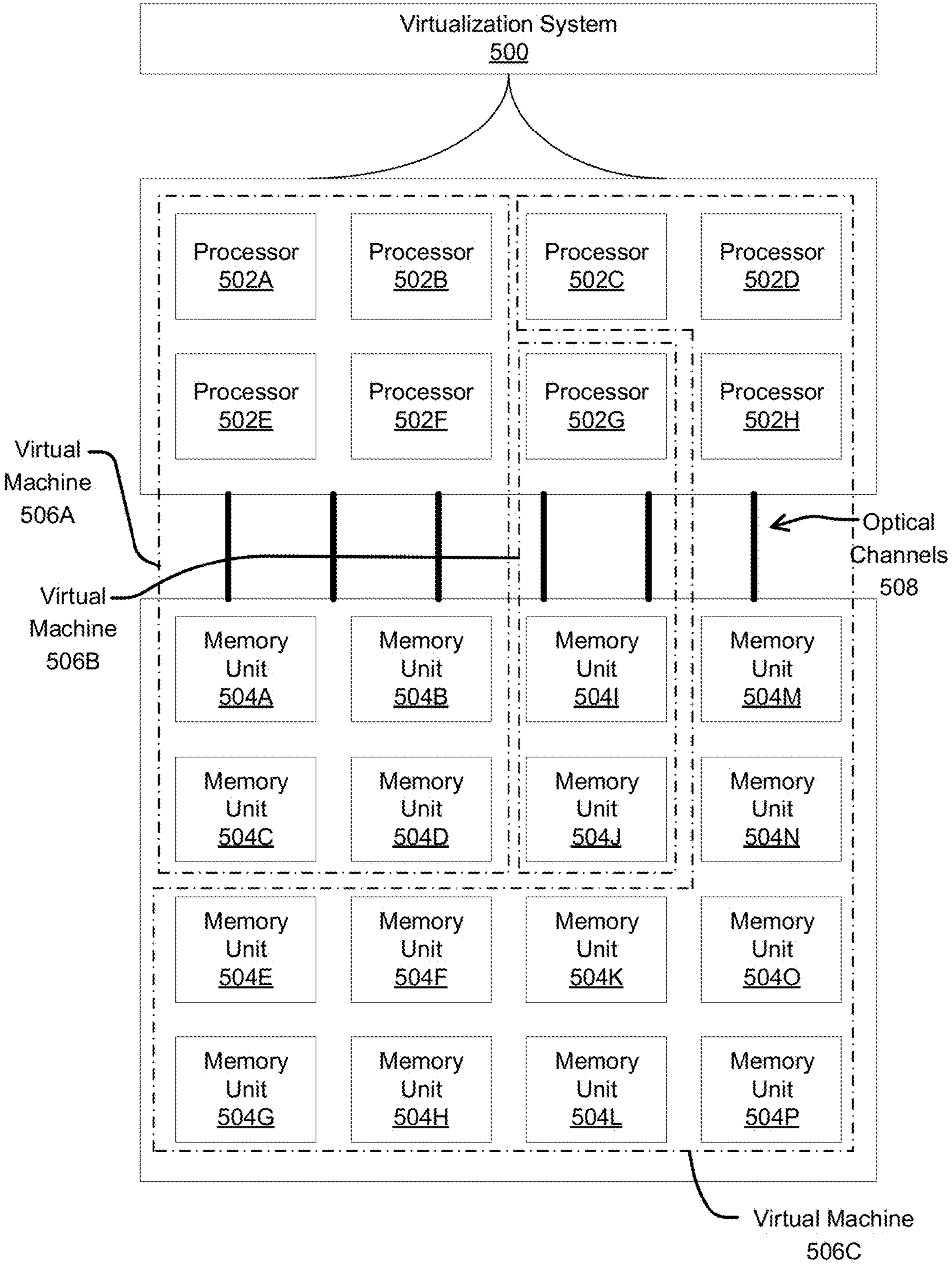
FIG. 5B illustrates a reallocation of processors and memory to the virtual machines of FIG. 5A, according to some embodiments of the technology described herein.

FIG. 5B illustrates a reallocation of processors and memory to the virtual machines 506A, 506B, 506C of FIG. 5A, according to some embodiments of the technology described herein. In some embodiments, the virtualization system 500 may be configured to reallocate resources (e.g., to distribute compute resources (e.g., processing capacity and memory) based on requirements of applications being executed by the virtual machines 506A, 506B, 506C and/or to balance load among the virtual machines 506A, 506B, 506C).

In some embodiments, the reallocation may be performed by programming photonic network(s) into different configurations. The virtualization system 500 may be configured to determine a reallocation and cause programming of the photonic network(s) based on the reallocation. For example, memory controller(s) associated with the photonic network(s) may program the photonic network(s) into a new configuration based on the reallocation determined by the virtualization system 500. In the allocation of FIG. 5B the photonic network(s) are programmed to: (1) allocate virtual machine 506A processors 502A, 502B, 502E, 502F with access to memory units 504A, 504B, 504C, 504D; 92) allocate virtual machine 506B processor 502G with access to memory units 504I, 504J; and (3) allocate virtual machine 506C processors 502C, 502D, 502H with access to memory units 504E, 504F, 504G, 504H, 504K, 504L, 504M, 504N, 504O, 504P.

Figure 6A:
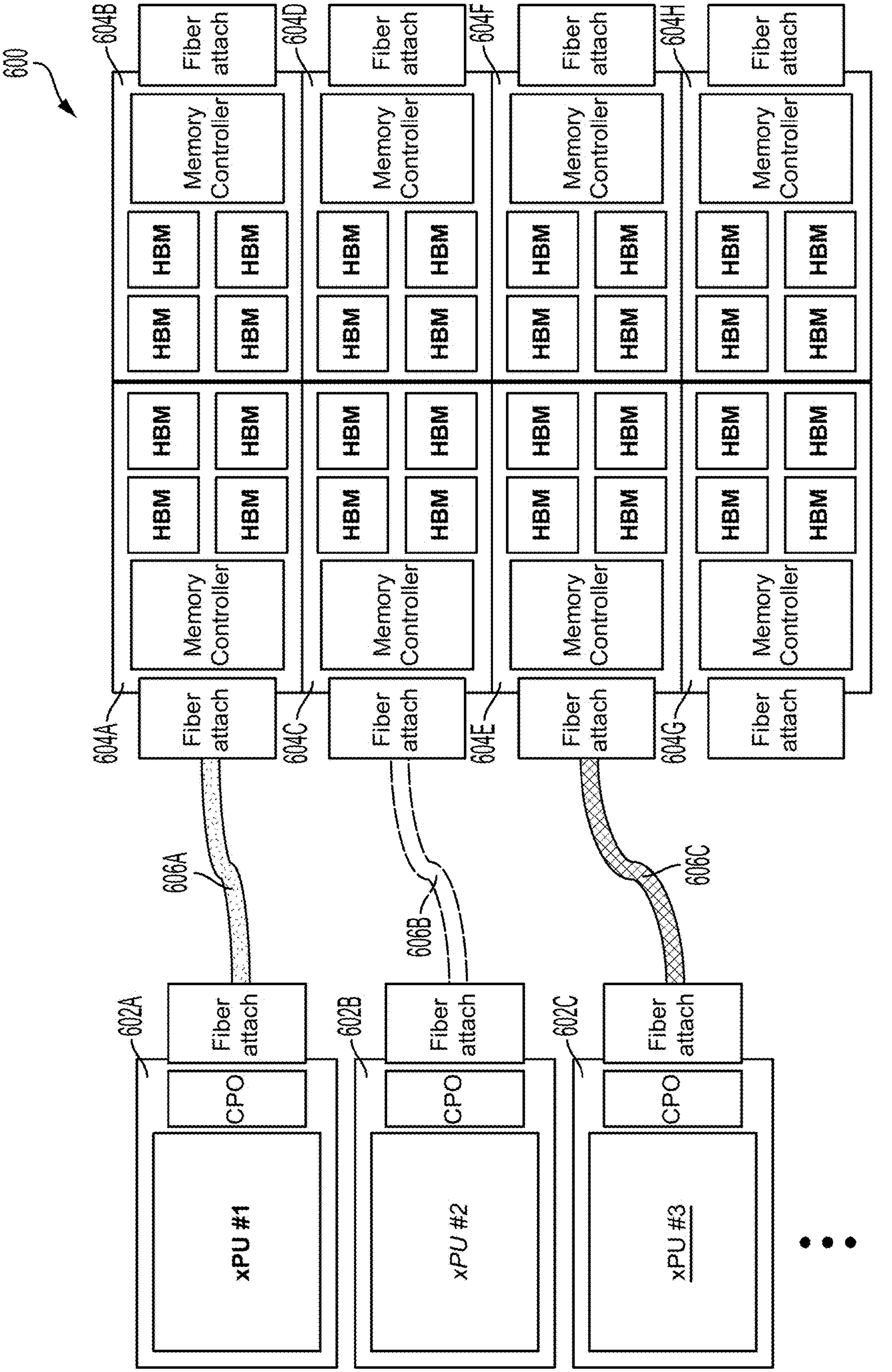
FIG. 6A shows an example photonic computing system, according to some embodiments of the technology described herein.

FIG. 6A shows an example photonic computing system 600, according to some embodiments of the technology described herein. As shown in FIG. 6A, the photonic computing system includes processors 602A, 602B, 602C connected to a photonic substrate comprising of photonic modules. In the example of FIG. 6A, the plurality of photonic modules are memory tiles 604A, 604B, 604C, 604D, 604E, 604F, 604G, 604H. The processors 602A, 602B, 602C are each connected to the photonic substrate by respective optical channels 606A, 606B, 606C. Each of the optical channels 606A, 606B, 606C is connected to an interface (e.g., a fiber attach) of a respective memory tile. As indicated by the three dots below the processors 602A, 602B, 602C, in some embodiments, the photonic computing system 600 may include additional processors connected to the photonic substrate.

As shown in FIG. 6A, each of the memory tiles 604 604A, 604B, 604C, 604D, 604E, 604F, 604G, 604H includes a set of HBM memory units. Each tile has four HBM memory units. Each tile may include a photonic network that can be programmed (e.g., by its respective memory controller) to configure which of the processors 602A, 602B, 602C can access each of its HBM memory units (e.g., by configuring optical switches).

Figure 6B:
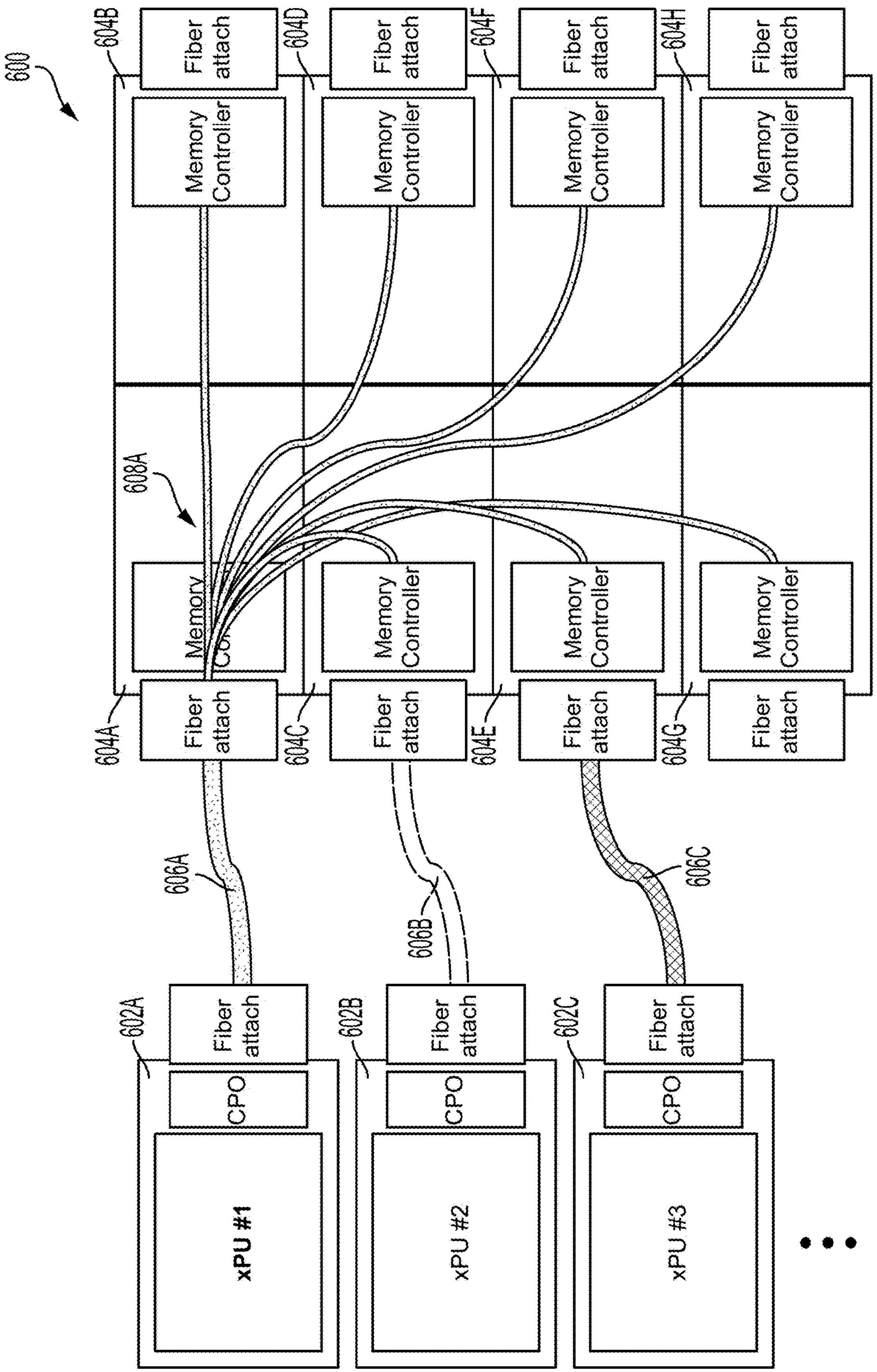
FIG. 6B shows an example set of connections from a fiber attach of a memory tile to memory controllers of all the memory tiles of FIG. 6A, according to some embodiments of the technology described herein.

FIG. 6B shows an example set of connections 608A from a fiber attach of a memory tile 604A to memory controllers of all the memory tiles 604A-604H, according to some embodiments of the technology described herein. For example, the set of connections 608A may be optical connections that connect to E/O transceivers associated with the memory controllers (e.g., co-located on memory tiles of the memory controllers). As another example, the set of connections 608A may be electrical connections from an E/O transceiver of memory tile 604A to the memory controllers. As shown in FIG. 6B, the connections 608A allow the processor 602A to communicate with a memory controller of each tile through the optical channel 606A. Thus, photonic networks of each of the memory tiles 604A-604H can be programmed (e.g., by a memory controller of the tile) to provide the processor 602A access to memory units of the tile.

Figure 6C:
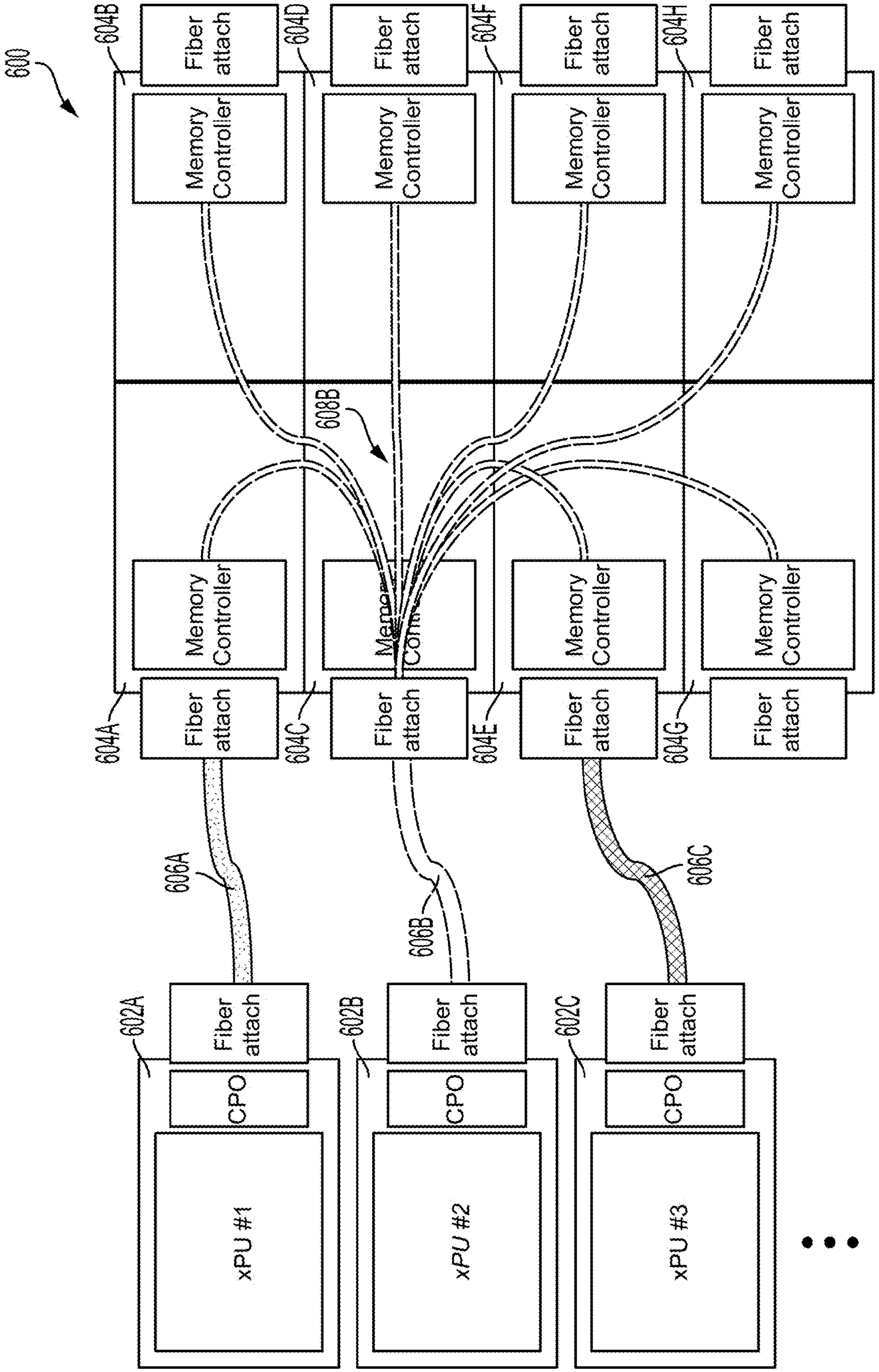
FIG. 6C shows another example set of connections from a fiber attach of another memory tile to memory controllers of all the memory tiles of FIG. 6A, according to some embodiments of the technology described herein.

FIG. 6C shows an example set of connections 608B from a fiber attach of a memory tile 604C to memory controllers of all the memory tiles 604A-604H, according to some embodiments of the technology described herein. For example, the set of connections 608B may be optical connections that connect to E/O transceivers associated with the memory controllers (e.g., co-located on memory tiles of the memory controllers). As another example, the set of connections 608B may be electrical connections from an E/O transceiver of memory tile 604B to the memory controllers. As shown in FIG. 6C, the connections 608B allow the processor 602B to communicate with a memory controller of each tile through the optical channel 606B. Thus, photonic networks of each of the memory tiles 604A-604H can be programmed (e.g., by a memory controller of the tile) to provide the processor 602A access to memory units of the tile.

Figure 7A:
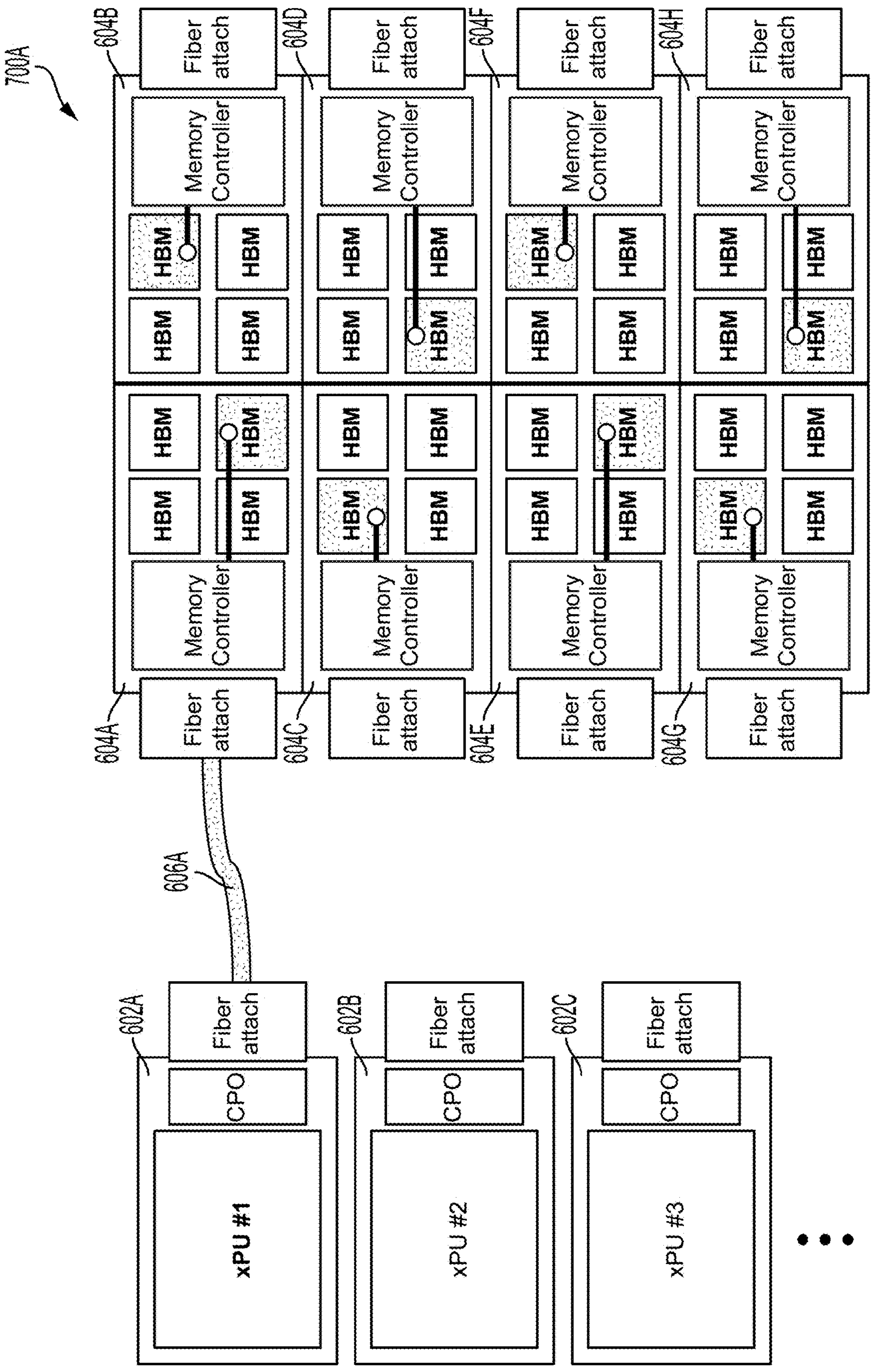
FIG. 7A shows an example configuration of photonic networks of the memory tiles of FIGS. 6A-6C, according to some embodiments of the technology described herein.

FIG. 7A shows an example configuration of photonic networks of the memory tiles 604A-604H of FIGS. 6A-6C, according to some embodiments of the technology described herein. As shown in FIG. 7A, a photonic network of each of the memory tiles 604A-604H is programmed to enable access to an HBM memory unit of the tile by the processor 602A. The processor 602A may be configured to access each of the HBM memory units through the connections illustrated in FIG. 6B.

Figure 7B:
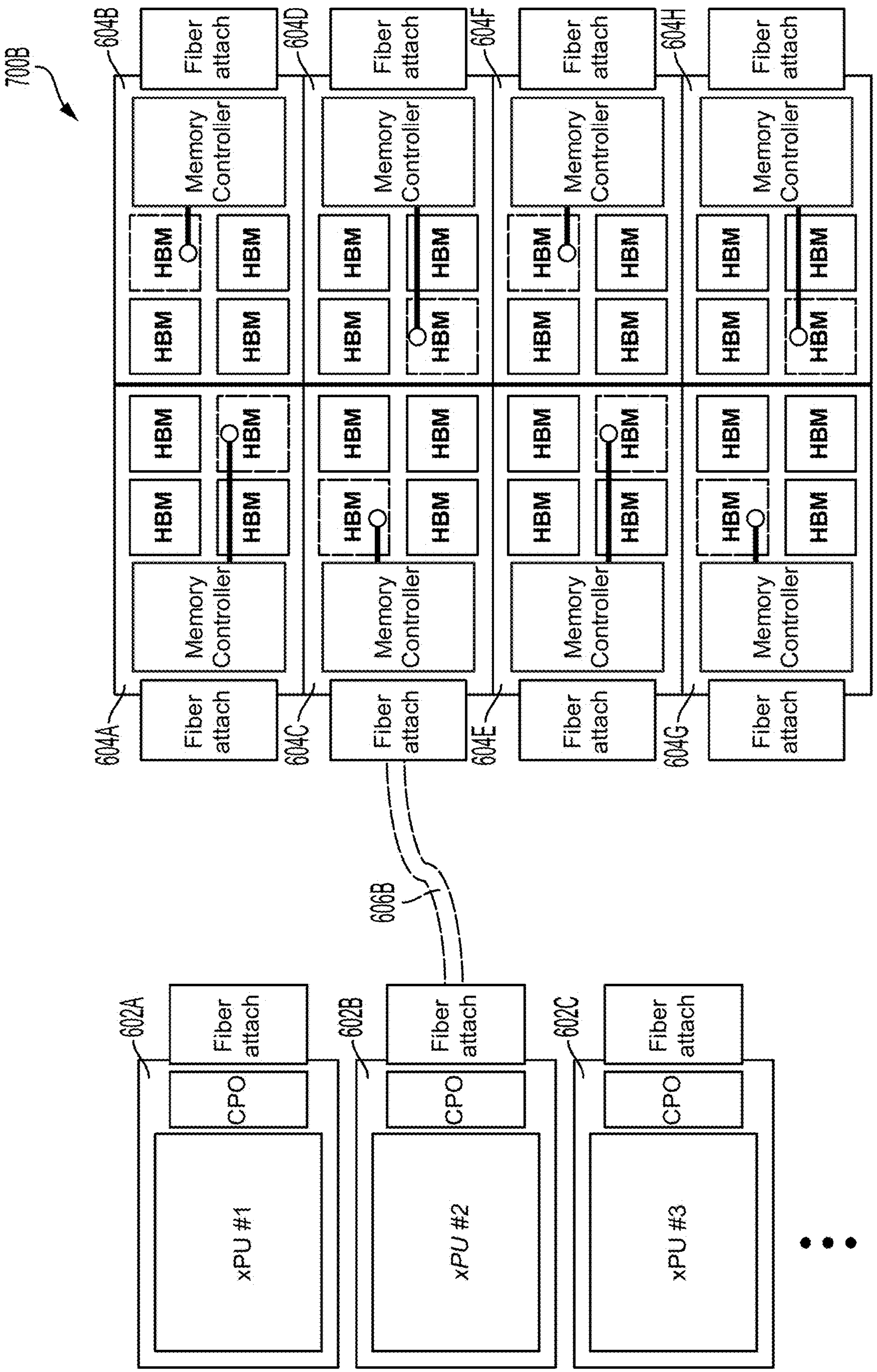
FIG. 7B shows another example configuration of photonic networks of the memory tiles 604A-604H of FIGS. 6A-6C, according to some embodiments of the technology described herein.

FIG. 7B shows another example configuration of photonic networks of the memory tiles 604A-604H of FIGS. 6A-6C, according to some embodiments of the technology described herein. The example configuration of photonic networks may be programmed after the configuration of FIG. 7A. As shown in FIG. 7B, a photonic network of each of the memory tiles 604A-604H is programmed to enable access to an HBM memory unit of the tile by the processor 602B. The processor 602B may be configured to access each of the HBM memory units through the connections illustrated in FIG. 6C. In some embodiments, the processor 602A may no longer have access to the HBM memory units. In some embodiments, the processor 602A may have concurrent access to the HBM memory units with the processor 602B.

Figure 8:
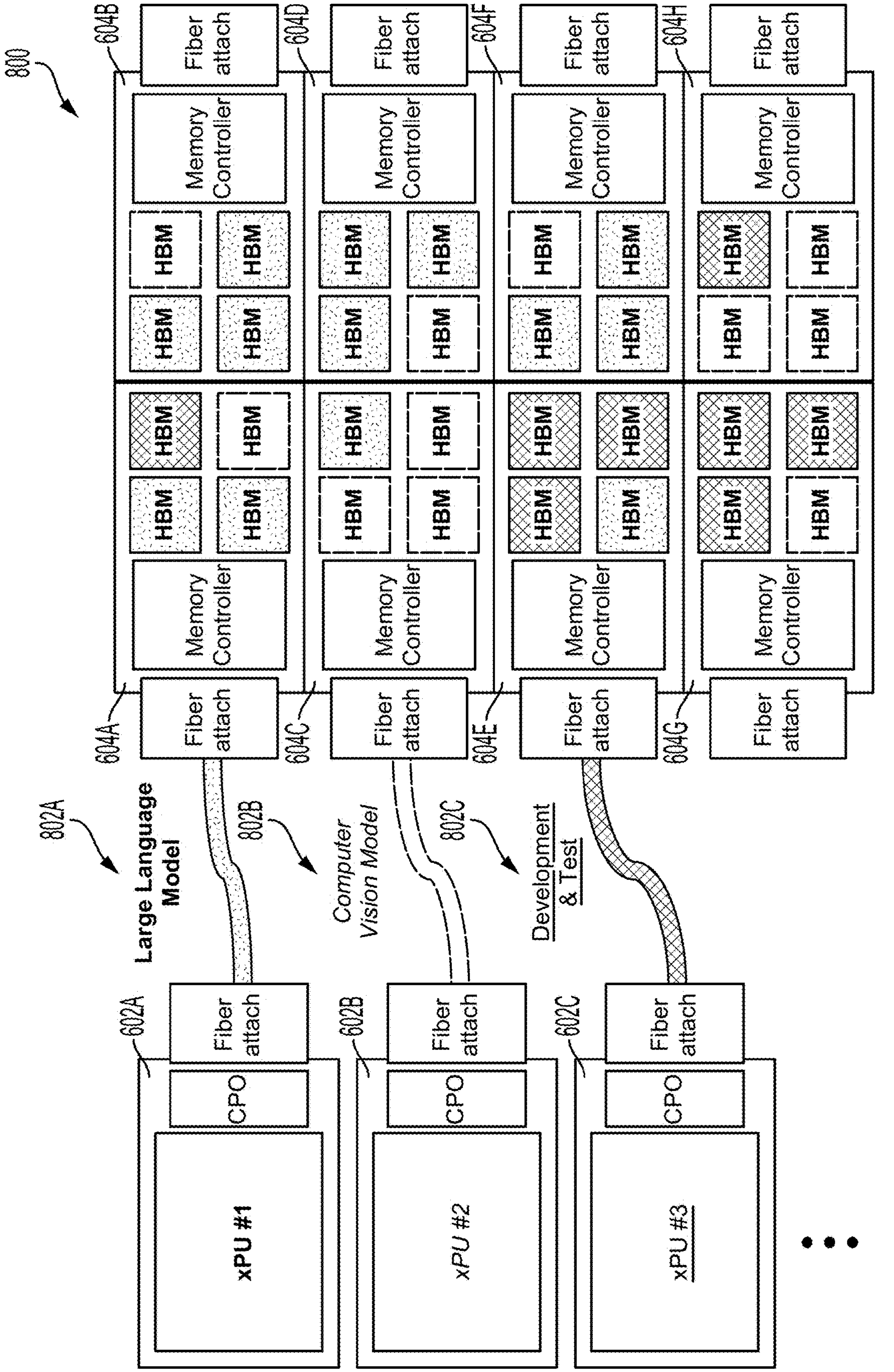
FIG. 8 shows an example configuration of the photonic computing system of FIG. 6A in which each of the processors is designated for a different application, according to some embodiments of the technology described herein.

FIG. 8 shows an example configuration 800 of the photonic computing system of FIG. 6A in which each of the processors 602A, 602B, 602C is designated for a different application, according to some embodiments of the technology described herein. As shown in the example of FIG. 8, the processor 602A is configured to execute a large language model (LLM) application 802A, the processor 602B is configured to execute a computer vision application 802B, and the processor 602C is configured to execute a develop and test application 802C. As illustrated in FIG. 8, each of the applications 802A, 802B, 802C is allocated a respective set of memory units from the memory tiles 604A-604H. The LLM application 802A is allocated two HBM memory units from tile 604A, three HBM memory units from tile 604B, one HBM memory unit from tile 604C, three HBM memory units from tile 604D, one HBM memory unit form tile 604E, three HBM memory units from tile 604F, no HBM memory units from tile 604G, and no HBM memory units from tile 604H. The computer vision model application 802B is allocated one HBM memory unit from tile 604A, one HBM memory units from tile 604B, three HBM memory units from tile 604C, one HBM memory unit from tile 604D, no HBM memory units form tile 604E, one HBM memory unit from tile 604F, one HBM memory unit from tile 604G, and three HBM memory units from tile 604H. The development and test application 802C is allocated one HBM memory unit from tile 604A, no HBM memory units from tile 604B, no HBM memory units from tile 604C, ono HBM memory units from tile 604D, three HBM memory units form tile 604E, no HBM memory units from tile 604F, three HBM memory units from tile 604G, and one HBM memory unit from tile 604H.

In some embodiments, each of the applications 802A, 802B, 802C may be allocated HBM memory units based on the requirements of the applications 802A, 802B, 802C. For example, the memory units allocated to each application may be determined based on an amount of memory required to execute the application.

Figure 9:
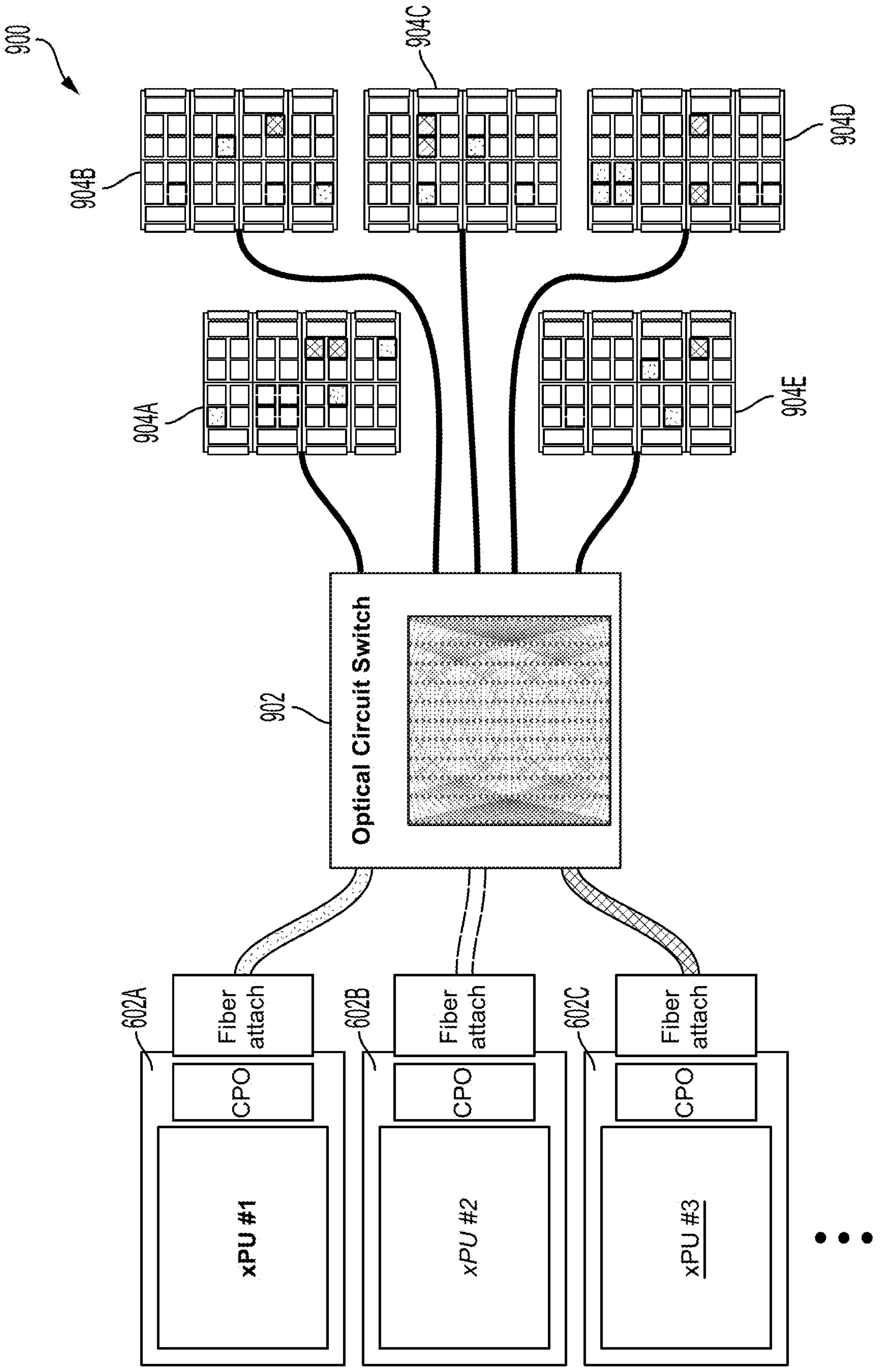
FIG. 9 shows an example photonic computing system in which a set of processors can access multiple disaggregated memory pools, according to some embodiments of the technology described herein.

FIG. 9 shows an example photonic computing system 900 in which a set of processors 602A, 602B, 602C can access multiple disaggregated memory pools 904A, 904B, 904C, 904D, 904E, according to some embodiments of the technology described herein. In some embodiments, each of the memory pools 904A, 904B, 904C, 904D, 904E may be a photonic substrate comprising multiple memory tiles (e.g., as illustrated in FIG. 6A). The processors 602A, 602B, 602C may access the memory pools 904A-904E through an optical circuit switch 902. In some embodiments, the optical circuit switch 902 may be configured to set which of the processors 602A, 602B, 602C can access each of the memory pools 904A-904E. As shown in FIG. 9, each of the processors 602A, 602B, 602C may be connected to the optical circuit switch 902 by a respective optical channel.

Each of the processors 602A, 602B, 602C may be provided access to memory units from different ones of the memory pools 904A-904E through the optical circuit switch 902.

Figure 10:
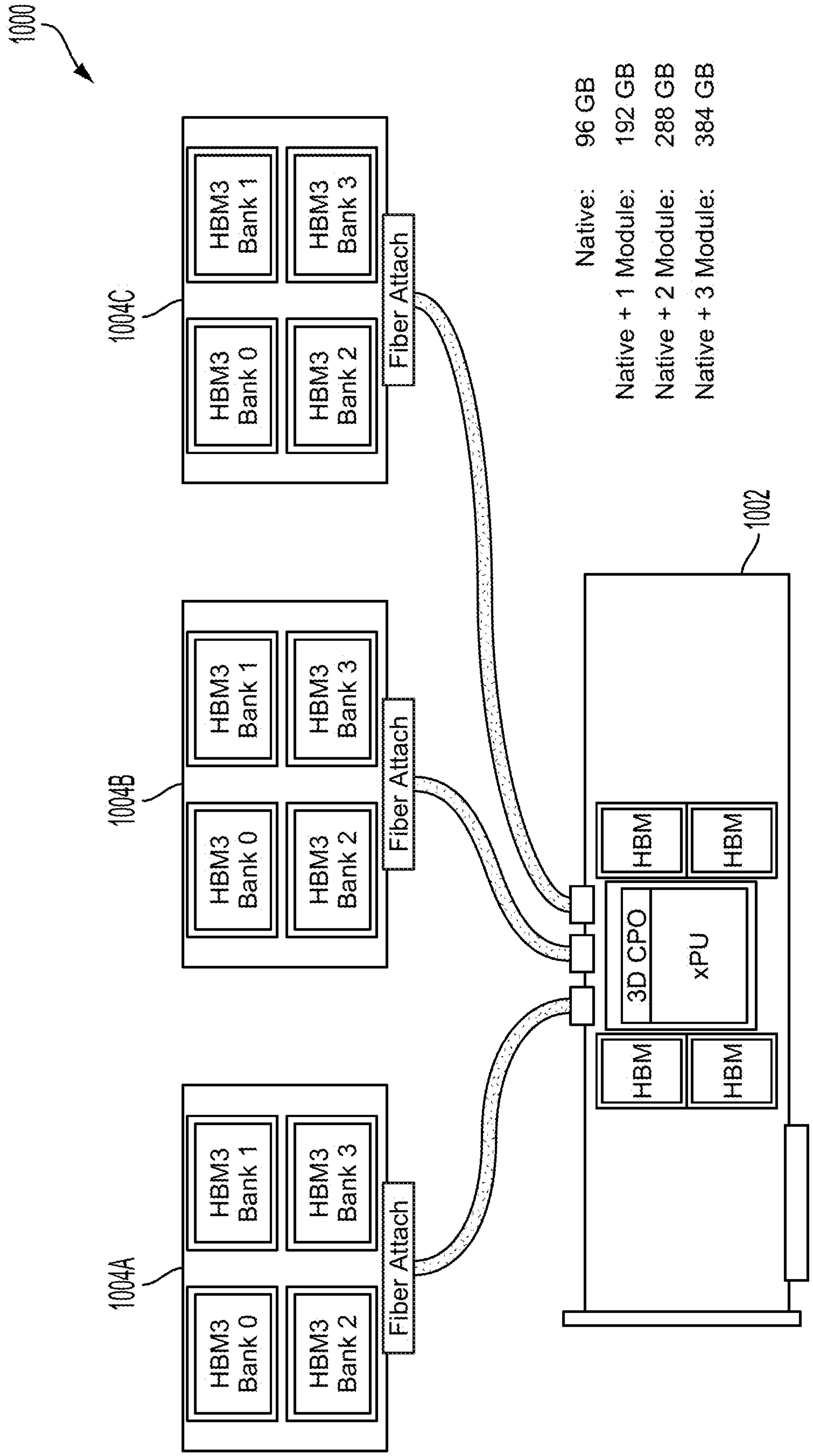
FIG. 10 shows an example photonic computing system in which memory of a computer system is expanded by multiple disaggregated sets of memory units, according to some embodiments of the technology described herein.

FIG. 10 shows an example photonic computing system 1000 in which memory of a computer system 1002 is expanded by multiple disaggregated sets of memory units 1004A, 1004B, 1004C, according to some embodiments of the technology described herein. As shown in FIG. 10, the computer system 1002 is connected to each set of memory units 1004A, 1004B, 1004C by a respective optical channel. In the example of FIG. 10, each set of memory units 1004A, 100B, 1004C includes for HBM banks as memory units. As indicated in FIG. 10, the computer system 1002 has a native memory of 96 GB. The computer system 1002 augmented with one set of memory units has 192 GB of memory. The computer system 1002 augmented with two sets of memory units has 288 GB of memory. The computer system 1002 augmented with three sets of memory has 384 GB.

Figure 11:
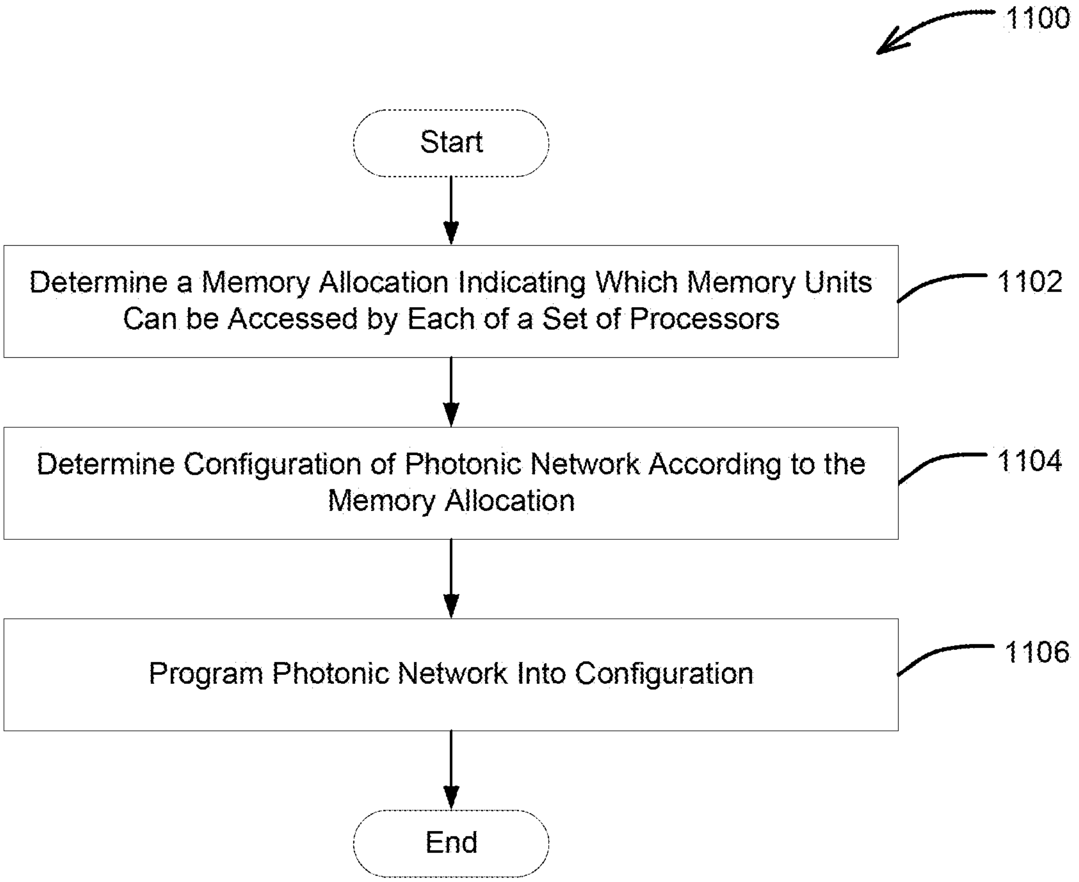
FIG. 11 is an example process for programming a photonic network, according to some embodiments of the technology described herein.

FIG. 11 is an example process 1100 for programming a photonic network, according to some embodiments of the technology described herein. In some embodiments, the process 1100 may be performed using a programmable photonic network that controls which of a set of one or more processors can access memory units of memory separate from the processor(s). For example, process 1100 may be performed by the photonic computing system described herein with reference to FIGS. 1A-1C.

Process 1100 begins at block 1102, where the system determines a memory allocation indicating which memory units can be accessed by each of the set of processor(s). In some embodiments, the system may be configured to determine a memory allocation for virtual CPUs (e.g., virtual machines as described herein with reference to FIGS. 5A-5B.). In some embodiments, the system may be configured to determine a memory allocation based on the requirements of one or more processes (e.g., software application(s)) to be executed by the system. In some embodiments, the system may be configured to determine a memory allocation for a stage of a parallelized execution of a process (e.g., as described herein with reference to FIG. 4). As an illustrative example, the system may determine a memory allocation that indicates, for each of a set of processor(s), which memory units can be accessed by the processor.

Next, process 1100 proceeds to block 1104, where the system determines a configuration of the photonic network based on the memory allocation. In some embodiments, the photonic network may comprise an optical circuit including one or more configurable optical switches. The system may be configured to determine a configuration of the photonic network by determining a configuration of the one or more optical switches according to the memory allocation. The configuration of the one or more optical switches may configure the photonic network such that each of the set of processor(s) would have access to memory unit(s) indicated by the memory allocation.

Next, process 1100 proceeds to block 1106, where the system programs the photonic network into the determined configuration. In some embodiments, the system may be configured to program the photonic network into the configuration by configuring the one or more optical switches of the photonic network. The system may be configured to configure the one or more optical switches such that an optical circuit of the photonic network enables communication between each of the set of processor(s) and its allocated memory unit(s). For example, the configuration may allow the set of processor(s) to read data from and write data into respective allocated memory unit(s).

Figure 12:
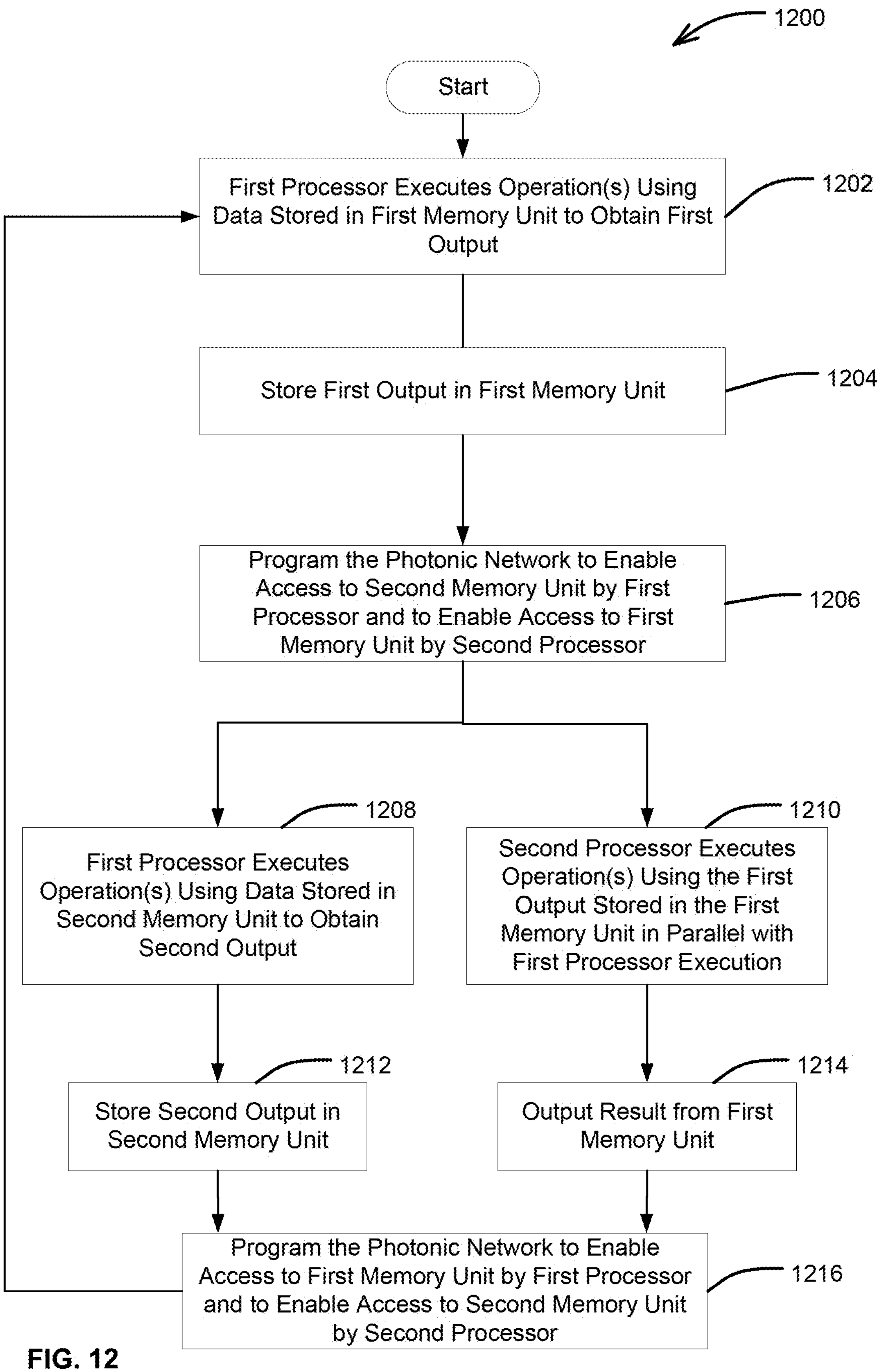
FIG. 12 is an example process for parallelized execution of a software application, according to some embodiments of the technology described herein.

FIG. 12 is an example process 1200 for parallelized execution of a software application, according to some embodiments of the technology described herein. In some embodiments, process 1200 may be performed by the photonic computing system described herein with reference to FIGS. 1A-1C. In some embodiments, the process 1200 may be performed when two processors are each configured to execute a respective application (e.g., one or more operations) to parallelize execution of the software application (e.g., as described herein with reference to FIG. 4).

In some embodiments, prior to performing process 1200, input data may be loaded into one or more of the memory units that are to be used in execution of the software application. The one or more memory units may include a first memory unit and a second memory unit. The first memory unit may have data stored therein. For example, an input to be used for execution of the software application may be stored in the first memory unit. In some embodiments, a photonic network of the system may be programmed into a particular configuration prior to execution of the process 1200. The photonic network may be programmed such that a first processor has access to the first memory unit and a second processor has access to the second memory unit.

Process 1200 begins at block 1202, where the first processor executes one or more operations using data stored in the first memory unit to obtain a first output. In some embodiments, the operation(s) may be operation(s) performed in response to executing instructions of a software application program. For example, the first processor may execute one or more functions using one or more numerical values stored in the first memory unit. Next, process 1200 proceeds to block 1204, where the system stores the first output obtained from executing the operation(s) at block 1202 in the first memory unit.

Next, process 1200 proceeds to block 1206, where the system programs the photonic network to enable access to the second memory unit by the first processor and to enable access to the first memory unit by the second processor. In some embodiments, the system may be configured to program the photonic network as described in process 1100 described herein with reference to FIG. 11. For example, the system may configure optical switches of an optical circuit to program the photonic network.

Next, process 1200 proceeds to block 1208, where the first processor executes operation(s) using the data stored in the second memory unit to obtain a second output. In some embodiments, the first processor may be configured to execute the same operation(s) as it executed at block 1202 but using the data that was stored in the second memory unit. For example, the first processor may execute one or more functions using numerical value(s) stored in the second memory unit.

At block 1210, the second processor executes operation(s) using the first output stored in the first memory unit in parallel with the execution of the first processor at block 1208. In some embodiments, the second processor may be configured to execute another software application using the first output stored in the first memory unit. For example, the output of the operation(s) executed by the first operation are further processed by the second processor to generate a final output.

Next, process 1200 proceeds to block 1212 where the system stores the second output obtained at block 1208 in the second memory unit. At block 1214, the system outputs, from the first memory unit, the result of the operation(s) executed by the second processor at block 1210. The outputted result may be an output corresponding to an input that was originally stored in the first memory unit.

Next, process 1200 proceeds to block 1216, where the system programs the photonic network to enable access to the first memory unit by the first processor and to enable access to the second memory unit by the second processor. The process 1200 then returns to block 1202 where the system processes a subsequent input (e.g., more numerical value(s)). The process 1200 may then proceed through blocks 1202-1216 of process 1200.

Figure 13:
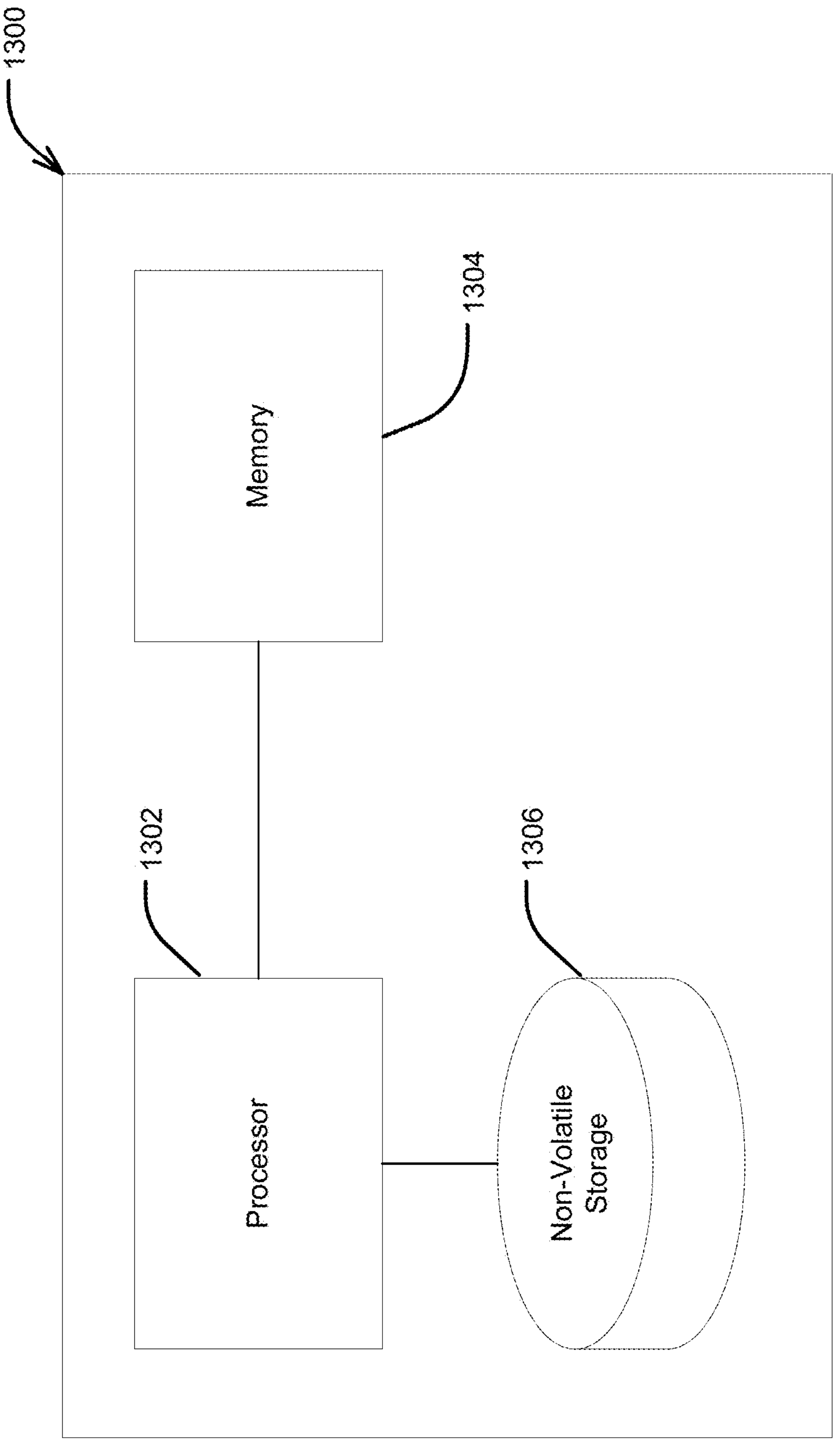
FIG. 13 is a block diagram of an illustrative computing system that may be used in implementing some embodiments of the technology described herein.

FIG. 13 is an example computer system that may be used to implement some embodiments of the technology described herein. The computing device 1300 may include one or more computer hardware processors 1302 and non-transitory computer-readable storage media (e.g., memory 1304 and one or more non-volatile storage devices 1306). The processor(s) 1302 may control writing data to and reading data from (1) the memory 1304; and (2) the non-volatile storage device(s) 1306. To perform any of the functionality described herein, the processor(s) 1302 may execute one or more processor-executable instructions stored in one or more non-transitory computer-readable storage media (e.g., the memory 1304), which may serve as non-transitory computer-readable storage media storing processor-executable instructions for execution by the processor(s) 1302.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Some embodiments provide a photonic computing system. The photonic computing system comprises: at least one processor; at least one optical channel; and at least one photonic substrate separate from the at least one processor, the at least one photonic substrate comprising a plurality of memory units and at least one photonic network for providing the at least one processor access to the plurality of memory units, wherein: the at least one photonic network is in communication with the at least one processor through the at least one optical channel; and the at least one photonic network is programmable to configure which of the plurality of memory units in the at least one photonic substrate the at least one processor can access through the at least one optical channel.

In some embodiments, the photonic computing system may include one or more of the following attributes:

- a. The at least one processor comprises a first processor and a second processor; and the first processor and the second processor are configured to process a dataset using the plurality of memory units.
- b. The at least one photonic network is programmed to enable access to a first memory unit of the plurality of memory units by the first processor and to enable access to a second memory unit of the plurality of memory units by the second processor, the first memory unit storing first data of the dataset; and processing the dataset stored comprises:
  - i. executing, by the first processor, an operation using data stored in the first memory unit to obtain a first output; and
  - ii. storing the first output in the first memory unit.
- c. After storing the first output in the first memory unit, the at least one photonic network is programmed to enable access to the first memory unit by the second processor and to enable access to the second memory unit by the first processor; and processing the dataset stored further comprises:
  - i. executing, by the first processor, an operation using data stored in the second memory unit to obtain a second output;
  - ii. executing, by the second processor in parallel with execution by the first processor, an operation using the first output stored in the first memory unit to obtain a first result;
  - iii. storing the second output in the second memory unit; and
  - iv. outputting the first result from the first memory unit.
- d. The at least one photonic network is programmed to enable access to the first memory unit by the first processor and to enable access to the second memory unit by the second processor; and processing the dataset stored in the plurality of memory units of the at least one photonic network further comprises:
  - i. executing, by the first processor, an operation using data stored in the first memory unit to obtain a third output;
  - ii. executing, by the second processor in parallel with the execution of the first processor, an operation using the second output stored in the second memory unit to obtain a second result;
  - iii. storing the third output in the first memory unit; and
  - iv. outputting the second result from the second memory unit.
- e. The at least one photonic network is programmed to enable access to a subset of the plurality of memory units by the at least one processor through the at least one optical channel.
- f. The at least one optical channel is configured to transmit data between the at least one processor and the at least one photonic network at a rate of at least 15 terabytes per second (Tbps).
- g. The at least one photonic network comprises at least one optical switch configurable to connect/disconnect the at least one processor to/from each of the plurality of memory units; and the at least one photonic network is programmable by configuring the at least one optical switch.
- h. At a first time, the at least one photonic network is programmed to enable access to a first one of the plurality of memory units by the at least one processor through the at least one optical channel; and at a second time subsequent to the first time, the at least one photonic network is programmed to:
  - i. disable access to the first memory unit by the at least one processor through the at least one optical channel; and
  - ii. enable access to a second one of the plurality of memory units by the at least one processor through the at least one optical channel.

i. The at least one processor comprises a first processor and a second processor; the plurality of memory units comprises a first memory unit and a second memory unit; and the at least one photonic network is programmed to enable access to the first memory unit by the first processor and access to the second memory unit by the second processor.

j. The plurality of memory units comprises a plurality of high bandwidth memory (HBM) units.

k. The plurality of memory units comprises a plurality of static random-access memory (SRAM) units.

l. The plurality of memory units comprises a plurality of double data rate (DDR) synchronous dynamic random access memory (SDRAM).

m. The at least one photonic substrate further comprises at least one memory controller configured to program the at least one photonic network.

n. The at least one processor is configured to program the at least one photonic network.

o. The at least one processor comprises a plurality of processors, the plurality of processors organized into multiple sets of processors; and the at least one photonic network is programmed to enable each of the sets of processors to access a different subset of the plurality of memory units through the at least one optical channel.

p. Each of the sets of processors and respective subset of the plurality of memory units accessible by the set of processors forms a respective virtual processor assigned to a respective virtual machine.

q. The at least one processor comprises a plurality of processors; the at least one optical channel comprises a plurality of optical channels; and each of the plurality of processors is in communication with the at least one photonic network through a respective one of the plurality of optical channels.

r. The at least one photonic network comprises a plurality of photonic networks; the at least one photonic substrate comprises a plurality of photonic modules each including:
   i. a respective one of the plurality of photonic networks;
   ii. a subset of the plurality of memory units; and
   iii. a memory controller.

s. Each of the plurality of processors is connected to memory controllers of the plurality of photonic modules through a respective one of the plurality of optical channels.

t. The at least one photonic network is programmed into a configuration to allocate memory units among the plurality of processors based on memory requirements for execution of a plurality of software applications, wherein the configuration:
   i. enables access to a first set of the plurality of memory units by a first one of the plurality of processors configured to execute a first software application; and
   ii. enable access to a second set of the plurality of memory units by a second one of the plurality of processors configured to execute a second software application.

u. The first software application uses a machine learning model.

v. The machine learning model is a large language model (LLM).

w. The machine learning model is a computer vision model.

x. The first software application is a software development and testing application.

y. The at least one photonic substrate comprises a plurality of photonic substrates, the plurality of photonic substrates each comprising a set of memory units and a respective photonic network, wherein:
   i. photonic networks of the plurality of substrates are each programmable to configure which of a respective set of memory units can be accessed by the at least one processor.

z. The optical computing system further comprises an optical switch, wherein the optical switch is configurable to provide the at least one processor with access to multiple memory units distributed across multiple ones of the plurality of photonic substrate.

aa. The at least one photonic substrate comprises at least one memory controller; and the at least one photonic network comprises an optical circuit interconnecting the at east one memory controller with the plurality of memory units.

bb. The at least one photonic network comprises a plurality of electrical/optical (E/O) transceivers each connecting a respective one of the plurality of memory units to the optical circuit.

cc. The at least one photonic substrate comprises: at least one memory controller; at least one fiber attach, the at least one fiber attach connected to the at least one optical channel; and at least one E/O transceiver; and the at least one photonic network comprises an optical circuit connecting the at least one memory controller to the at least one fiber attach, wherein the E/O transceiver is configured to convert signals transmitted between the at least one memory controller and the at least one fiber attach.

dd. The at least one photonic network comprises a plurality of electrical connections between the at least one memory controller and the plurality of memory units, wherein data signals are transmitted between the at least one memory controller and the plurality of memory units through the plurality of electrical connections.

Some embodiments provide a method of using a photonic network to perform parallelized data processing using a plurality of memory units. The photonic network is programmable to configure which of the plurality of memory units can be accessed by a first processor and a second processor. The photonic network is programmed to enable access to a first memory unit of the plurality of memory units by the first processor and to enable access to a second memory unit of the plurality of memory units by the second processor. The method comprises: programming the photonic network to enable access to the second memory unit by the first processor and to enable access to the first memory unit by the second processor; executing, by the first processor, an operation using data stored in the second memory unit to obtain an output; and executing, by the second processor in parallel with execution of the first processor, an operation using data stored in the first memory unit.

In some embodiments, the method may include one or more of the following attributes:

a. The method further comprises programming the photonic network to enable access to the first memory unit by the first processor and to enable access to the second memory unit by the second processor; executing, by the first processor, an operation using data stored in the first memory unit; and executing, by the second processor in parallel with execution of the first processor, an operation using data stored in the second memory unit.

b. The method further comprises storing, in the second memory unit, a result of the operation executed by the first processor using the data stored in the second memory unit.

Some embodiments provide a photonic network placed on a photonic substrate. The photonic network is accessible through at least one optical channel. The photonic network comprises: a plurality of memory units; at least one configurable optical switch that controls which of the plurality of memory units are accessible through the at least one optical channel; and at least one electrical/optical (E/O) transceiver for transmitting data to and from the plurality of memory units through the at least one optical channel.

In some embodiments, the photonic network may have one or more of the following attributes:

a. At a first time, the at least one optical switch is configured to enable access to a first one of the plurality of memory units through the at least one optical channel; and at a second time subsequent to the first time, the at least one optical switch is configured to enable access to a second one of the plurality of memory units through the at least one optical channel.

b. At the second time, the at least one optical switch is programmed to disable access to the second memory unit through the at least one optical channel.

c. The photonic network further comprises a memory controller, wherein the at least one optical switch is configurable by the memory controller.

d. The photonic network comprises an optical circuit, the optical circuit comprising the at least one configurable optical switch.

e. The at least one E/O transceiver comprises a plurality of E/O transceivers connected to respective ones of the plurality of memory units; and the optical circuit connects the memory controller to the plurality of memory units through the plurality of E/O transceivers.

f. The photonic network comprises a fiber attach, wherein: the optical circuit connects the memory controller to the fiber attach through the at least one E/O transceiver.

Some embodiments provide a method of manufacturing a photonic computing system. The method comprises manufacturing the photonic computing system to include: at least one processor; at least one optical channel; and at least one photonic substrate separate from the at least one processor, the at least one photonic substrate comprising a plurality of memory units and at least one photonic network for connecting the at least one processor to the plurality of memory units, wherein: the at least one photonic network is in communication with the at least one processor through the at least one optical channel; and the at least one photonic network is programmable to configure which of the plurality of memory units in the at least one photonic substrate the at least one processor can access through the at least one optical channel.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A photonic computing system comprising:

a first processor and a second processor; and at least one photonic substrate separate from the first and second processors, the at least one photonic substrate comprising a plurality of memory units and at least one photonic network for providing the first and second processors access to the plurality of memory units, wherein:

the at least one photonic network is programmed to enable access to a first memory unit of the plurality of memory units by the first processor and to enable access to a second memory unit of the plurality of memory units by the second processor, the at least one photonic network is programmed to enable access to the first memory unit by the second processor and to enable access to the second memory unit by the first processor, the first processor is configured to execute an operation using data stored in the second memory unit to obtain a first output, and the second processor is configured to execute, in parallel with execution of the first processor, an operation using data stored in the first memory unit to obtain a second output.

2. The photonic computing system of claim 1, wherein: the first processor is further configured to store the first output in the first memory unit.

3. The photonic computing system of claim 2, wherein: the second processor is further configured to store the second output in the second memory unit.

4. The photonic computing system of claim 1, wherein: the first processor is further configured to execute an operation using data stored in the first memory unit to obtain a third output;

the second processor is further configured to execute, in parallel with the execution of the first processor to obtain the third output, an operation using the second output stored in the second memory unit to obtain a fourth output.

5. The photonic computing system of claim 1, wherein: the at least one photonic network is programmed to enable access to a subset of the plurality of memory units by the first and second processors through at least one optical channel.

6. The photonic computing system of claim 1, wherein, at a first time, the at least one photonic network is programmed to enable access to the first memory unit of the plurality of memory units by the first processor; and at a second time subsequent to the first time, the at least one photonic network is programmed to:

disable access to the first memory unit by the first processor; and enable access to the second memory unit of the plurality of memory units by the second processor.

7. The photonic computing system of claim 1, wherein, the at least one photonic network comprises at least one optical switch configurable to connect/disconnect the first processor to/from each of the plurality of memory units; and the at least one photonic network is programmable by configuring the at least one optical switch.

8. The photonic computing system of claim 1, wherein the at least one photonic network is programmed to enable the first and second processors to access a different subset of the plurality of memory units.

9. The photonic computing system of claim 8, wherein, each of first and second processors and respective subset of the plurality of memory units accessible by first and second of processors forms a respective virtual processor assigned to a respective virtual machine.

10. The photonic computing system of claim 1, wherein: each of the first and second processors is in communication with the at least one photonic network through a respective one of a plurality of optical channels.

11. The photonic computing system of claim 10, wherein: the at least one photonic network comprises a plurality of photonic networks;

the at least one photonic substrate comprises a plurality of photonic modules each including:

a respective one of the plurality of photonic networks;

a subset of the plurality of memory units; and a memory controller.

12. The photonic computing system of claim 11, wherein the at least one photonic network is programmed into a configuration to allocate memory units among the first and second processors based on memory requirements for execution of a plurality of software applications, wherein the configuration:

enables access to a first set of the plurality of memory units by the first processor configured to execute a first software application; and enable access to a second set of the plurality of memory units by the second processor configured to execute a second software application.

13. The photonic computing system of claim 1, further comprising an optical switch, wherein:

the at least one photonic substrate comprises a plurality of photonic substrates, the plurality of photonic substrates each comprising a set of memory units and a respective photonic network, wherein photonic networks of the plurality of substrates are each programmable to configure which of a respective set of memory units can be accessed by the first processor; and the optical switch is configurable to provide the first processor with access to multiple memory units distributed across multiple ones of the plurality of photonic substrate.

14. The photonic computing system of claim 1, wherein: the at least one photonic substrate comprises at least one memory controller;

the at least one photonic network comprises an optical circuit interconnecting the at least one memory controller with the plurality of memory units; and the at least one photonic network comprises a plurality of electrical/optical (E/O) transceivers each connecting a respective one of the plurality of memory units to the optical circuit.

15. The photonic computing system of claim 1, wherein: the at least one photonic substrate comprises:

at least one memory controller;

at least one fiber attach, the at least one fiber attach connected to at least one optical channel; and at least one E/O transceiver; and the at least one photonic network comprises:

an optical circuit connecting the at least one memory controller to the at least one fiber attach, wherein the at least one E/O transceiver is configured to convert signals transmitted between the at least one memory controller and the at least one fiber attach; and a plurality of electrical connections between the at least one memory controller and the plurality of memory units, wherein data signals are transmitted between the at least one memory controller and the plurality of memory units through the plurality of electrical connections.

16. A method of using a photonic network to perform parallelized data processing using a plurality of memory units, the photonic network programmable to configure which of the plurality of memory units can be accessed by a first processor and a second processor, the photonic network programmed to enable access to a first memory unit of the plurality of memory units by the first processor and to enable access to a second memory unit of the plurality of memory units by the second processor, the method comprising:

programming the photonic network to enable access to the second memory unit by the first processor and to enable access to the first memory unit by the second processor;

executing, by the first processor, an operation using data stored in the second memory unit to obtain an output; and executing, by the second processor in parallel with execution of the first processor, an operation using data stored in the first memory unit.

17. The method of claim 16, further comprising:

programming the photonic network to enable access to the first memory unit by the first processor and to enable access to the second memory unit by the second processor;

executing, by the first processor, an operation using data stored in the first memory unit;

executing, by the second processor in parallel with execution of the first processor, an operation using data stored in the second memory unit.

18. The method of claim 16, further comprising:

storing, in the second memory unit, a result of the operation executed by the first processor using the data stored in the second memory unit.

19. The method of claim 16, further comprising:

outputting, from the first memory unit, a result of the operation executed by the second processor using the data stored in the first memory unit.

20. The method of claim 16, further comprising:

programming the photonic network to enable access to the first memory unit by the first processor and to enable access to the second memory unit by the second processor after executing the operation by the second processor.

* * * * *